US012177022B2

(12) United States Patent
Wong et al.

(10) Patent No.: US 12,177,022 B2
(45) Date of Patent: Dec. 24, 2024

(54) COMMUNICATIONS DEVICES, INFRASTRUCTURE EQUIPMENT, AND METHODS

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 17/629,782

(22) PCT Filed: Jul. 24, 2020

(86) PCT No.: PCT/EP2020/071013
§ 371 (c)(1),
(2) Date: Jan. 25, 2022

(87) PCT Pub. No.: WO2021/023531
PCT Pub. Date: Feb. 11, 2021

(65) Prior Publication Data
US 2022/0368465 A1 Nov. 17, 2022

(30) Foreign Application Priority Data

Aug. 6, 2019 (EP) ..................................... 19190403

(51) Int. Cl.
*H04L 1/1812* (2023.01)
*H04L 1/1607* (2023.01)
*H04L 5/00* (2006.01)

(52) U.S. Cl.
CPC .......... *H04L 1/1812* (2013.01); *H04L 1/1621* (2013.01); *H04L 5/0053* (2013.01)

(58) Field of Classification Search
CPC ... H04L 1/1812; H04L 1/1621; H04L 5/0053; H04L 1/1822; H04L 1/1864
See application file for complete search history.

(56) References Cited

U.S. PATENT DOCUMENTS

2010/0153803 A1\* 6/2010 Harada ................. H04L 1/1854
714/E11.131
2016/0234820 A1\* 8/2016 Mallik .................. H04L 1/1861
(Continued)

FOREIGN PATENT DOCUMENTS

EP 2129032 A1 12/2009
KR 10-2018-0058597 A 6/2018

OTHER PUBLICATIONS

International Search Report and Written Opinion mailed on Oct. 14, 2020, received for PCT Application PCT/EP2020/071013, Filed on Jul. 24, 2020, 15 pages.

(Continued)

*Primary Examiner* — Ajit Patel
*Assistant Examiner* — Wilfred Thomas
(74) *Attorney, Agent, or Firm* — XSENSUS LLP

(57) ABSTRACT

A communications device is configured to receive a plurality of downlink control information DCI messages each of the DCI messages providing an indication of communications parameters for the communications device to receive a plurality of transport blocks in communications resources of the downlink according to a plurality of hybrid automatic repeat request-type, HARQ, processes. The communications device receives, after each received DCI message, one or more of the plurality of transport blocks from the communications resources of the downlink and determines whether data carried by the received one or more transport blocks has been decoded correctly. The communications device then transmits for each of the one or more received transport blocks a HARQ feedback message providing one of an (Continued)

acknowledgement, ACK, or a negative acknowledgement NACK, on an uplink of the wireless access interface according to a corresponding one of the HARQ processes.

16 Claims, 11 Drawing Sheets

(56) References Cited

U.S. PATENT DOCUMENTS

| | | | |
|---|---|---|---|
| 2019/0103944 A1* | 4/2019 | Wu | H04L 1/0052 |
| 2019/0273582 A1 | 9/2019 | Yeo et al. | |
| 2021/0266106 A1* | 8/2021 | Yan | H04L 1/1896 |
| 2022/0368465 A1* | 11/2022 | Wong | H04L 1/1812 |

OTHER PUBLICATIONS

Ericsson (Rapporteur), "Introduction of NB-IoT in 36.321", 3GPP TSG-RAN2 Meeting #94, R2-164521, May 23-27, 2016, 32 pages.

Ericsson, "Summary of 7.1.3.3 (resource allocation)", TSG-RAN WG1 #94bis, R1-1812010, Oct. 8-12, 2018, 29 pages.

Ericsson et al., "New WID on Even Further Enhanced MTC for LTE", 3GPP TSG RAN Meeting #75, RP-170732, Mar. 6-9, 2017, 4 pages.

NEC, "UE handling of NDI and TBS", TSG-RAN WG2 meeting #40, R2-040186, Jan. 12-16, 2004, 5 pages.

Nokia et al., "Revised SID: Study on NR Industrial Internet of Things (Iot)", 3GPP TSG RAN meeting #81, RP-182090, Sep. 10-13, 2018, 5 pages.

Huawei et al., "New WID on Further NB-IOT Enhancements", 3GPP TSG RAN Meeting #75, RP-170852, Mar. 6-9, 2017, 6 pages.

Holma et al., "LTE for UMTS OFDMA and SC-FDMA Based Radio Access", John Wiley & Sons, 2009, 232 pages.

Ericsson, "Revised WID: Additional MTC Enhancements for LTE", 3GPP TSG RAN Meeting #84, RP-191356, Jun. 3-6, 2019, 5 pages.

Futurewei, "WID Revision: Additional Enhancements for NB-Iot", 3GPP TSG RAN meeting #84, RP-191576, Jun. 3-6, 2019, 4 pages.

Ericsson, "Scheduling of Multiple DL/UL Transport Blocks in LTE-MTC", 3GPP TSG-RAN WG1 Meeting #95, Tdoc R1-1812121, Nov. 12-16, 2018, 7 pages.

* cited by examiner

COMMUNICATIONS DEVICES, INFRASTRUCTURE EQUIPMENT, AND METHODS

CROSS-REFERENCE TO RELATED APPLICATIONS

The present application is based on PCT/EP2020/071013 filed on Jul. 24, 2020, and claims priority to EP 19190403.6 filed on Aug. 6, 2019, the entire contents of each are incorporated herein by reference.

BACKGROUND

Field of Disclosure

The present disclosure relates to communications devices, infrastructure equipment and methods for transmitting and receiving data on the uplink or the downlink of a wireless communications network using an Automatic Repeat request (ARQ) type protocol such as a Hybrid ARQ protocol.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

There is expected to be a desire for future wireless communications networks, for example those which may be referred to as 5G or new radio (NR) system/new radio access technology (RAT) systems [1], as well as future iterations/releases of existing systems, to support connectivity efficiently for a wide range of devices associated with different applications and different characteristic data traffic profiles.

The increasing use of different types of network infrastructure equipment and terminal devices associated with different traffic profiles gives rise to new challenges for efficiently handling communications in wireless communications systems that need to be addressed. For example efficient communications using ARQ type protocols such as HARQ which can provide for the retransmission of transport blocks (data units, data-grams, data packets) following feedback response messages (ACK or NACK) may need adaptation for new types of application.

SUMMARY OF THE DISCLOSURE

The present disclosure can help address or mitigate at least some of the issues discussed above.

Embodiments of the present technique can provide a method of receiving data on the downlink by a communications device (UE) or receiving data on the uplink by an infrastructure equipment (eNB). For the downlink for example, the method comprises receiving, by the communications device, a plurality of downlink control information DCI messages (DCI for short). Each of the DCI messages providing an indication of communications parameters for the communications device to receive a plurality of transport blocks in communications resources of the downlink of the wireless access interface according to a plurality of hybrid automatic repeat request-type, HARQ, processes. The communications resources of the downlink from which the communications device can receive the plurality of transport blocks may be communications resources of a downlink shared channel such as for example a PDSCH. The method further comprises receiving, after each received DCI message, one or more of the plurality of transport blocks from the communications resources of the downlink channel, determining whether data carried by the received one or more transport blocks has been decoded correctly, and transmitting for each of the one or more received transport blocks a HARQ feedback message providing one of an acknowledgement, ACK, or a negative acknowledgement NACK, on an uplink of the wireless access interface according to a corresponding one of the HARQ processes. The one or more received transport blocks may be less than the number of the plurality of transport blocks for which communications resources are allocated, because one or more of the plurality of transport blocks may not be transmitted, because for example, there is no data for that HARQ process to send. The indication of the communications parameters provided by each of the DCI message for the plurality of transport blocks provides an indication of whether each of the plurality of transport blocks is an initial transmission or a retransmission of the transport block according to the corresponding HARQ processes. The receiving, after each received DCI message, includes combining the estimate of whether each of the one or more received transport blocks was decoded correctly for a previous plurality of transport blocks with the indication of the communications parameters for the communications device to receive a subsequent plurality of the transport blocks provided by the DCI message after the estimate, to identify a status of the subsequent plurality of the transport blocks to be received.

The status for example can include an indication that one or more of the transport blocks is not transmitted although communications resources will have been allocated because each of the DCI messages provide communications resources for the same number of transport blocks as a multi-transport block allocation.

Embodiments of the present technique, which further relate to infrastructure equipment eNB), methods of operating communications devices (UEs) and infrastructure equipment, and circuitry for communications devices and infrastructure equipment, can provide an arrangement in which an eNB or a UE can skip transmission/reception of PDSCH or PUSCH whilst still using the same communications parameters to allocate resources for both the multi-transport block DCI for retransmissions and initial transmissions.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
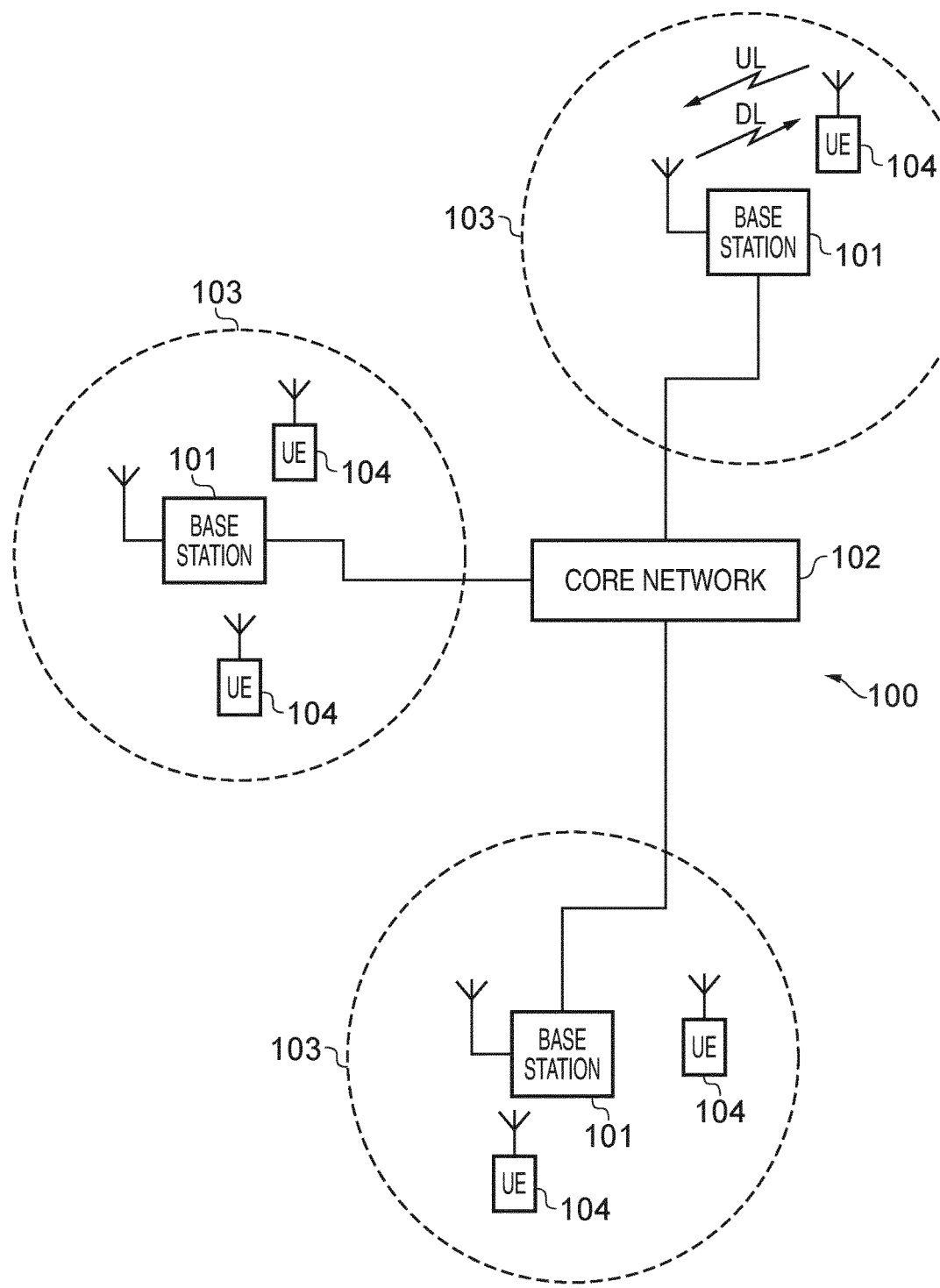
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (®) body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture.

That is to say, the use of a specific term in relation to certain example implementations is not intended to indicate these implementations are limited to a certain generation of network that may be most associated with that particular terminology.

New Radio Access Technology (5G)

Figure 2:
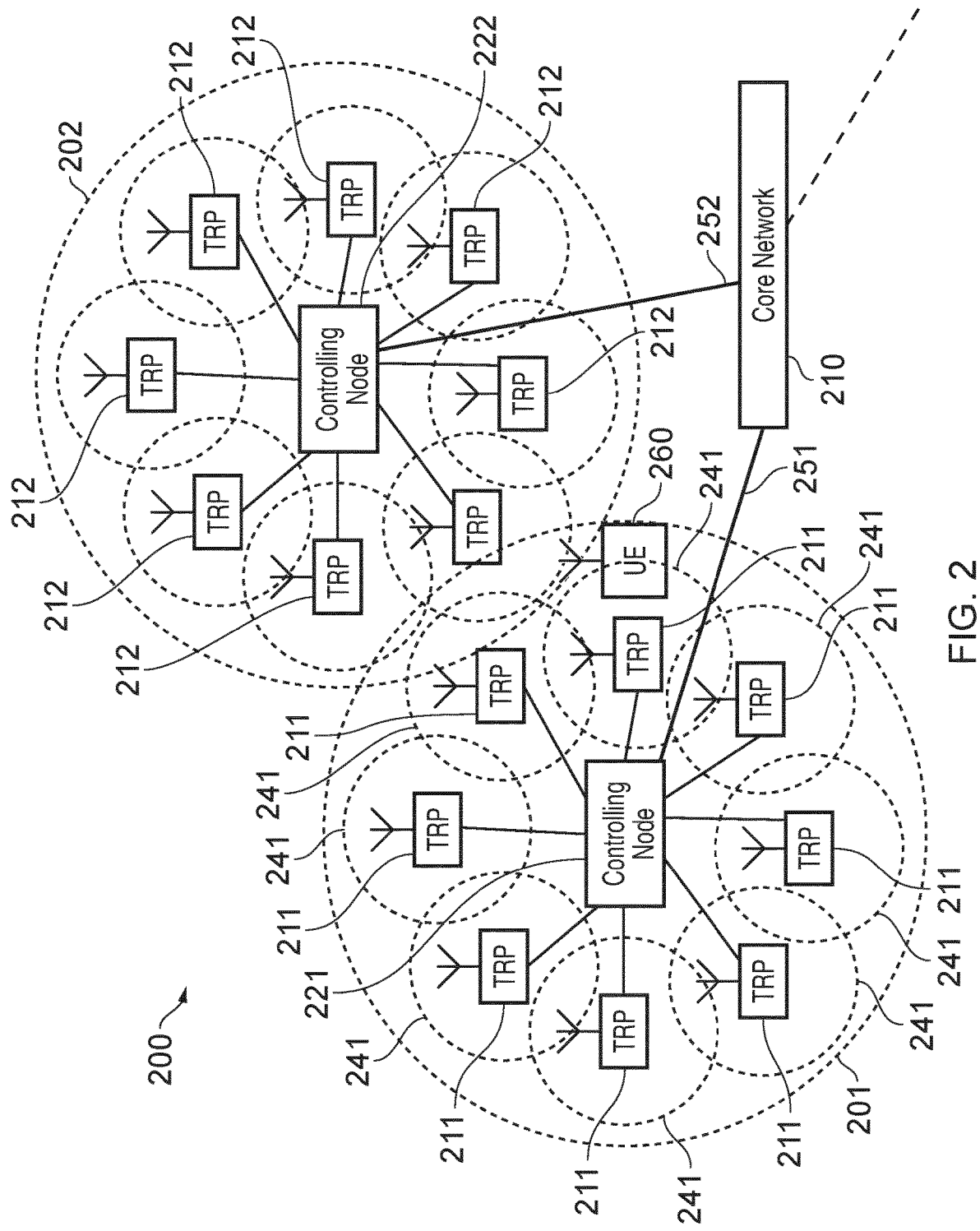
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
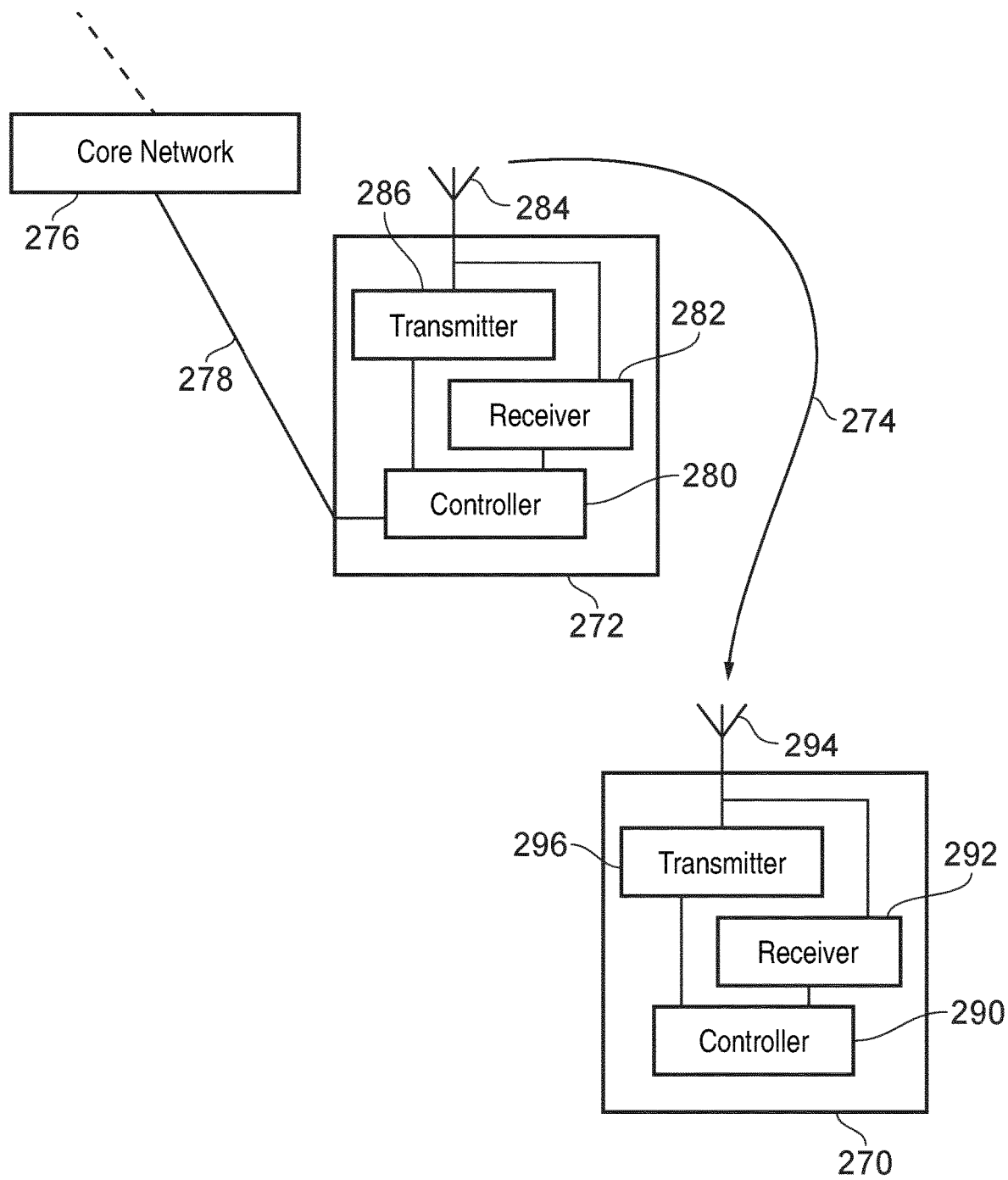
FIG. 3 is a schematic block diagram of an example infrastructure equipment and communications device which may be configured to operate in accordance with certain embodiments of the present disclosure.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to receive downlink data from the infrastructure equipment 272 via resources of a wireless access interface as illustrated generally by an arrow 274. The UE 270 receives the downlink data transmitted by the infrastructure equipment 272 via communications resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Figure 13:
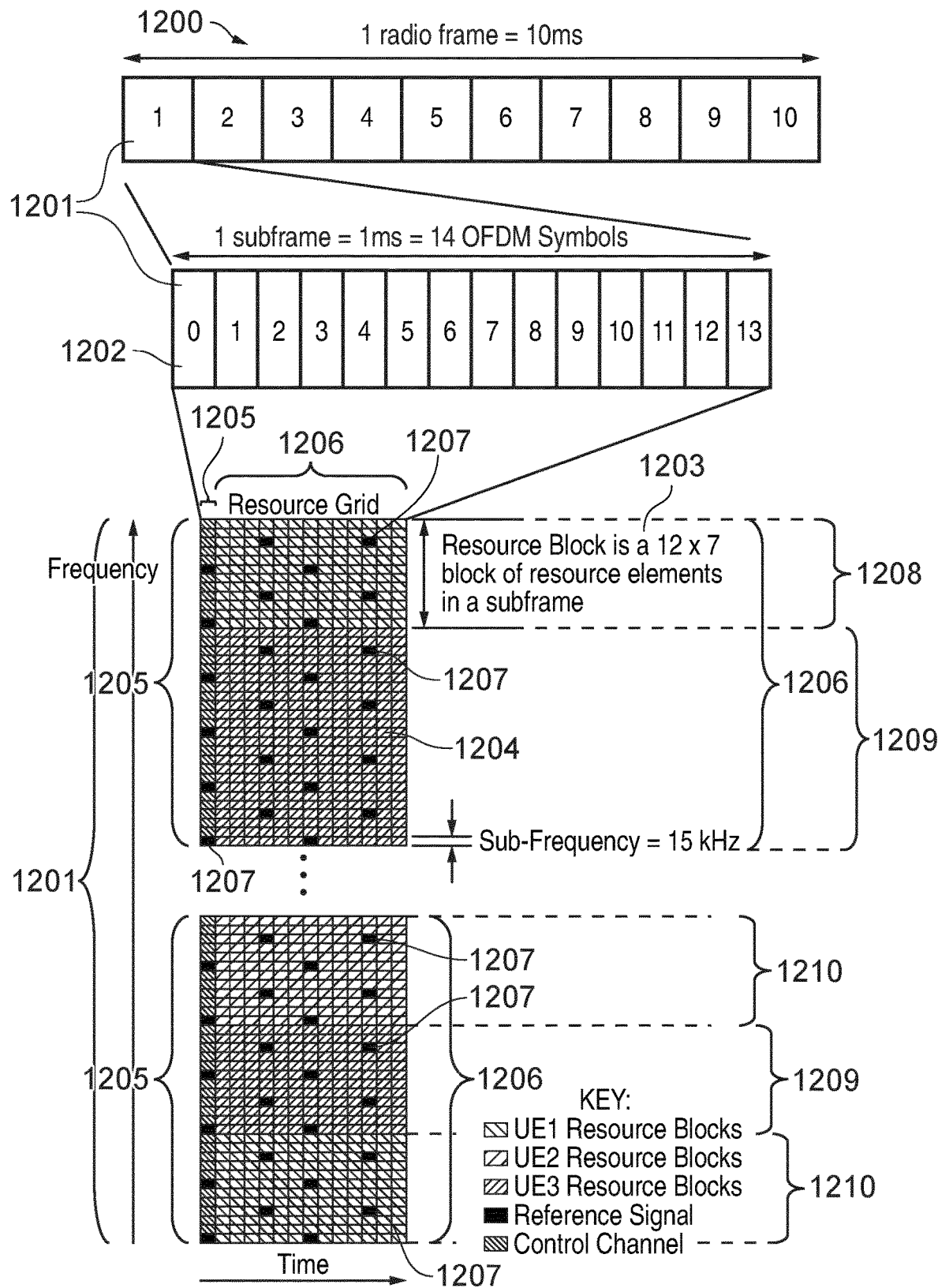
FIG. 13 is an example representation of a downlink frame structure according to a 4G or Long Term Evolution example.
Figure 14:
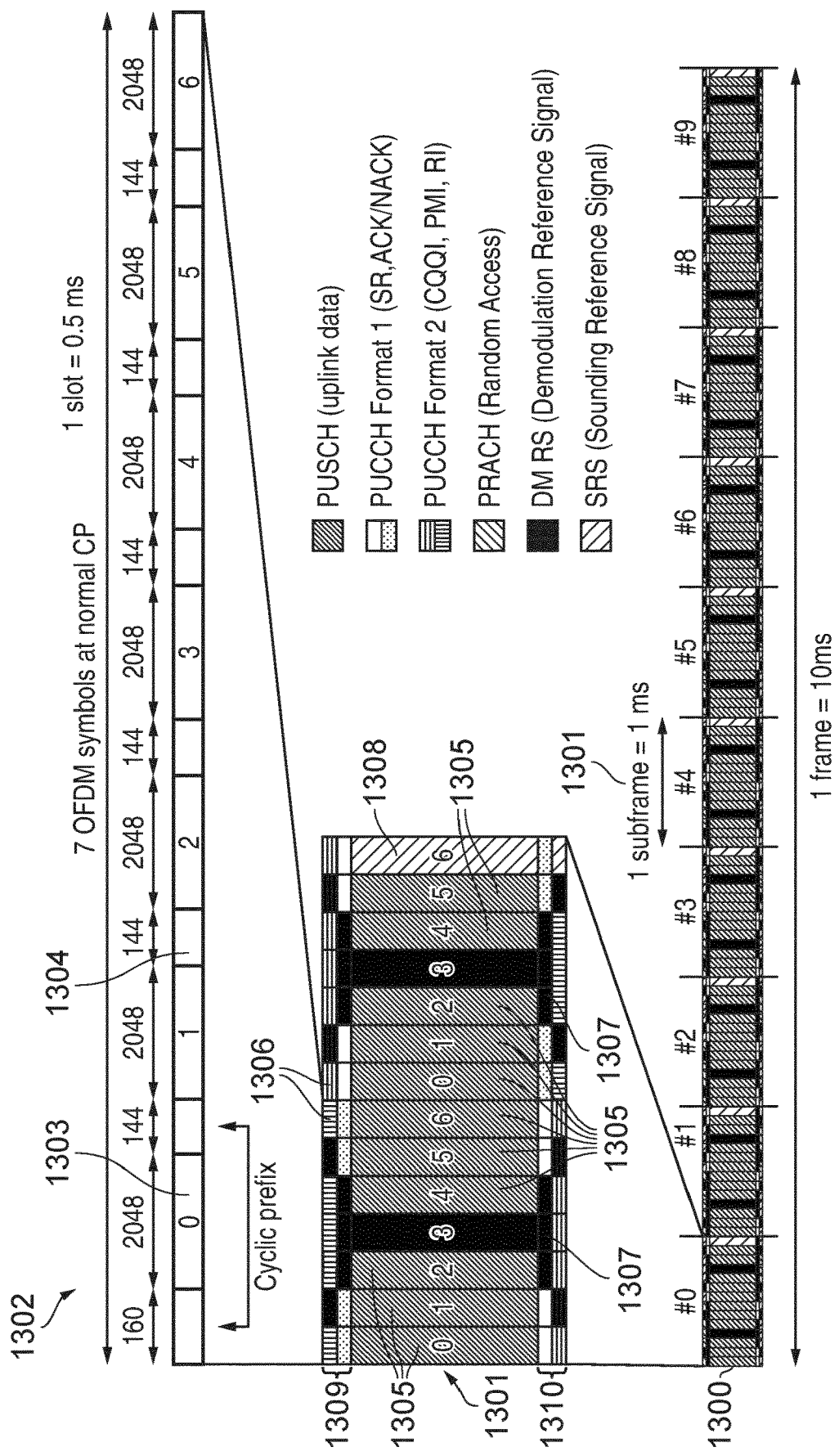
FIG. 14 is an example representation of an uplink frame structure according to a 4G or Long Term Evolution example.

A better appreciation provided by the example embodiments can be gained from reviewing a proposed wireless access interface according to 3GPP LTE/4G and NR/5G. A wireless access interface in accordance with a 3GPP Standard for LTE is described in detail in Annex 1 in which FIGS. 13 and 14 provide a detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and OFDM or SC-FDMA on the uplink.

Figure 4:
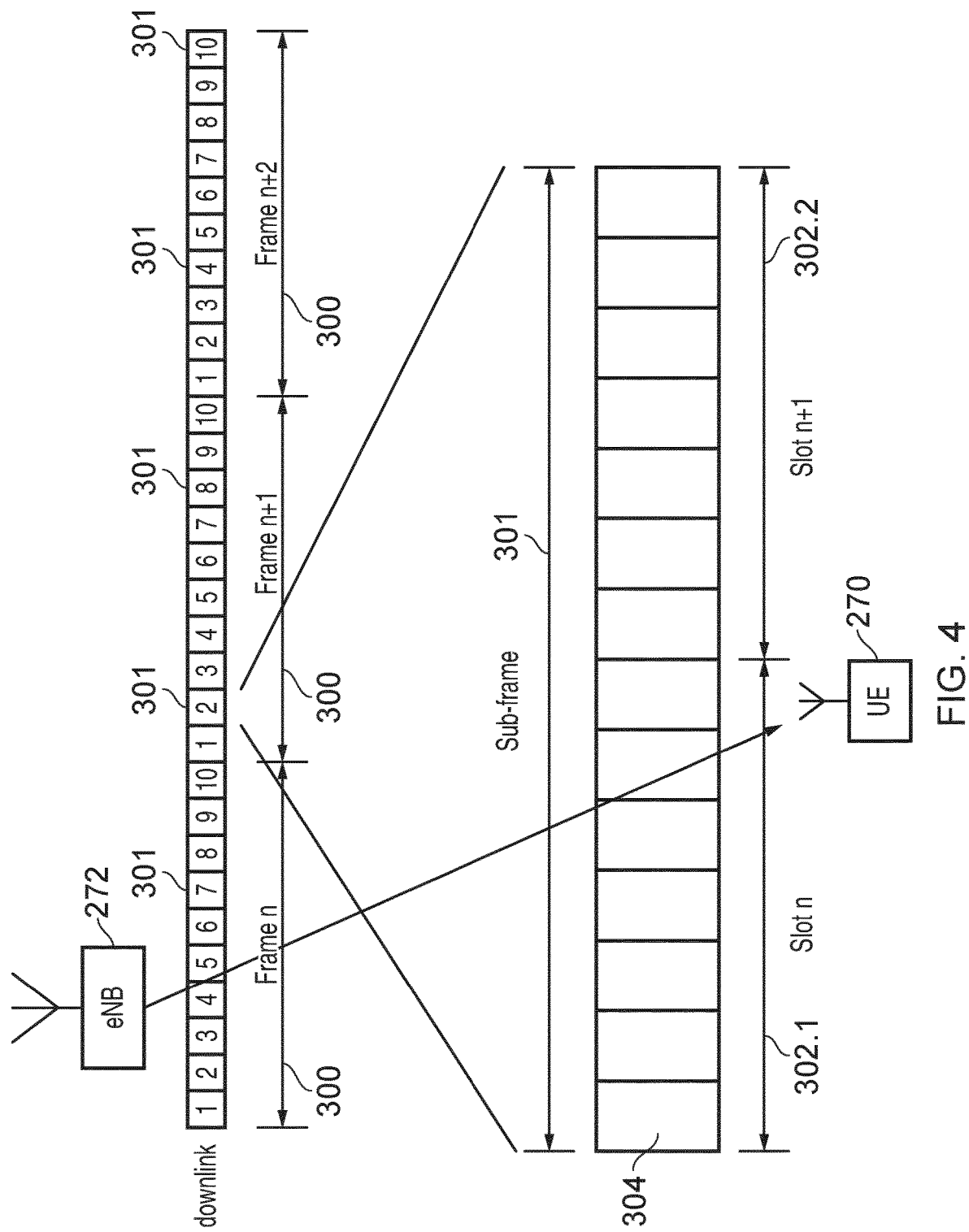
FIG. 4 provides a schematic illustration of a frame and sub-frame structure which includes a plurality of slots for illustrating example embodiments in which a physical downlink control channel (PDCCH) and a physical downlink shared channel (PDSCH) can be formed.

FIG. 4 provides a simplified representation of a downlink frame/sub-frame structure based on an LTE frame structure, although it will be appreciated that corresponding changes can be made for embodiments relating to an NR wireless access interface structure and the eNB would be labelled as a gNB. In FIG. 4 a simplified version of the downlink frame/sub-frame structure is provided in order to assist in the explanation of the example embodiments. As shown in FIG. 4, the downlink of the wireless access interface is shown to comprise frames 300 with respect to which the UE 270 transmits uplink data to the infrastructure equipment 272. Consistent with the explanation provided in Annex 1, the downlink comprises in each frame 300 ten sub-frames 301. A frame 300 is defined by 10 ms, a sub-frame 301 is defined by 1 ms, and a slot 302 is defined by seven OFDM symbols, represented by rectangles 304 for LTE, with a subcarrier spacing of 15 kHz and two time slots 302.1, 302.2 per 10 ms sub-frame 301. An expanded view of the components of a sub-frame 310 are shown to be formed from two consecutive slots n and n+1, 302.1 and 302.2, include physical resources of a shared channel as well as control channels as explained in Annex 1 with reference to FIG. 13. As will be appreciated, a corresponding simplified version of the uplink can be envisaged based on the more detailed representation provided in Annex 1 with reference to FIG. 14.

Grant of PDSCH/PUSCH for Multiple Transport Blocks

Current developments in communications technology such as that proposed by 3GPP on Internet of Things (IoT) namely, efeMTC (Even Further Enhanced Machine Type Communications) [3] and feNB-IoT (Further Enhanced Narrowband Internet of Things) [4] are considering improvements relating to the allocation of increased amounts of physical resource to communications devices for communicating on the uplink and the downlink Improvement in IoT technologies are being considered for projects such as A-MTC (Additional Machine Type Communications Enhancements) [5] and A-NB-IoT (Additional Enhancement for Narrowband Internet of Things) [6].

Figure 5:
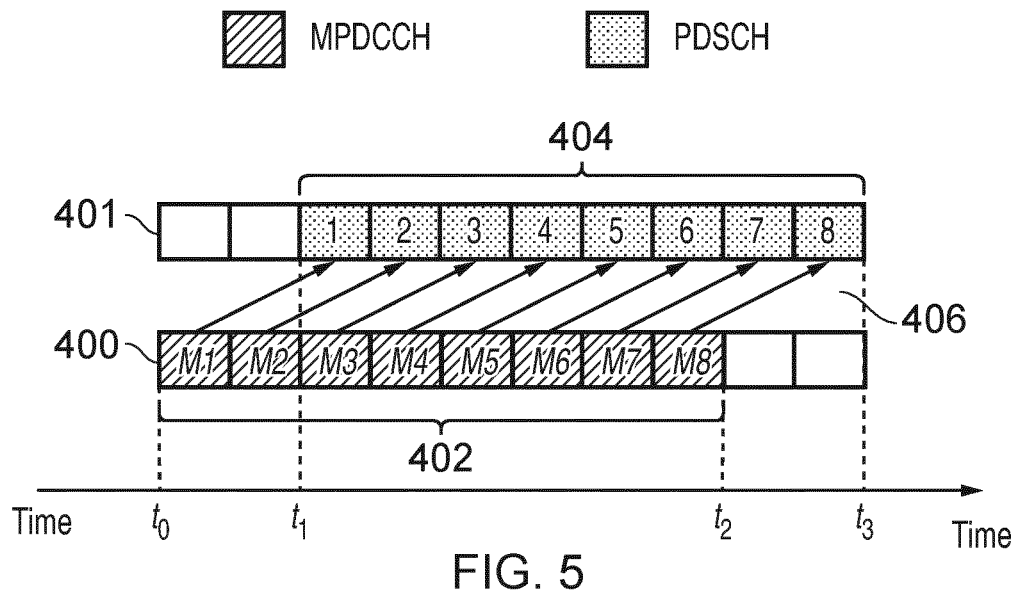
FIG. 5 provides a representation of two example downlink time-divided structures which respectively illustrate transmission/reception of a plurality of downlink control information (DCI) messages in PDCCHs and transmission/reception of a corresponding plurality of transport blocks.

One proposal for increasing physical resource allocations of shared channels under A-MTC is to enhance scheduling of DL/UL transport blocks. In previous proposals for eMTC systems, a single downlink control information (DCI) message which carries an UL grant or a DL grant schedules a single PUSCH transport block or single PDSCH transport block respectively. Transport blocks have a maximum transport block size for a PDSCH, which may be for example 1000 bits. If the eNB has 8000 data bits to send to a UE, it has to send eight MPDCCHs for eight DL grants to schedule eight PDSCHs where each PDSCH has a transport block size of 1000 bits. This is shown in an example in FIG. 5, where the eNB transmits eight MTC Downlink Control Channel (MPDCCHs) messages each providing a DCI to the UE M1, M2, M3, M4, M5, M6, M7, M8 in each of a plurality of time slots 402 of a first section of the downlink 400 to schedule eight corresponding allocations of resources of a Physical Downlink Shared Channel (PDSCH) 404 in corresponding time slots 1, 2, 3, 4, 5, 6, 7, 8 of the downlink 401 at a later time as represented by arrows 406.

In FIGS. 5 to 11 two sections of downlink times slots are shown as boxes 400, 401 to represent a transmission of one or more DCI messages in one part of the downlink 400 and an allocation of the shared channel resources in another part of the downlink 401, although it will be appreciated that both downlink parts 400, 401 are the same downlink channel of the wireless access interface as explained above. The MPDCCH and PDSCH of the downlink parts may include the same time slots although it will be appreciated that there is a delay between transmission of the MPDCCH and the allocation of resources in the PDSCH in order for the UE to process the DCI message and receive the allocation of the PDSCH. Therefore in order to illustrate diagrammatically transmission of the DCI messages allocating resources of the PDSCH, two representations of the downlink wireless access interface are used although in reality this is the same downlink channel. Also in FIGS. 5 to 11, number n within "{ }" referring to HARQ process ID relates to a HARQ process with a number n which uses a particular time slot, in which that HARQ process ID n transmits a transport block numbered m.

Figure 6:
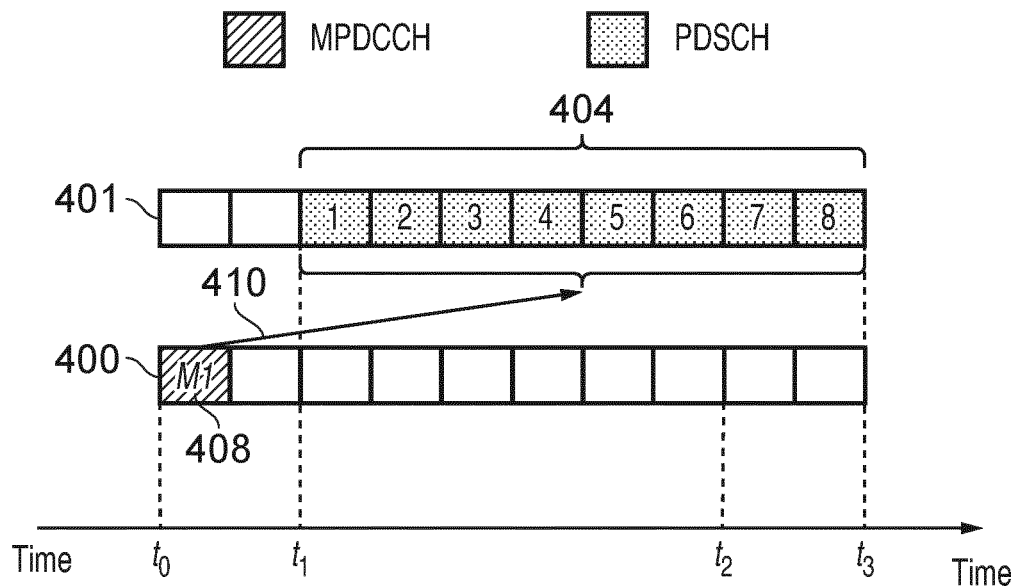
FIG. 6 provides a representation of two example downlink time-divided structures which respectively illustrate transmission/reception of a single downlink control information (DCI) message in a PDCCH and transmission/reception of a plurality of transport blocks according to communications parameters which allocate communications resources for the plurality of transport blocks.

As will be appreciated, using a single MPDCCH to schedule a single transport block (PUSCH or PDSCH) is inefficient. Accordingly it is now being considered to schedule multiple transport blocks per DCI, in which a single DCI can schedule more than one transport block. An example in which a single DCI transmitted in a time slot of an MPDCCH allocates multiple PDSCH transport blocks is shown in FIG. 6, where the eNB has 8000 data bits to send to the UE. Here the UE transmits a single DCI in a time slot 408 carried by MPDCCH M1 of the downlink 400, the DCI carrying a single DL grant scheduling eight PDSCH transport blocks 404 of the downlink 400 at some later time as represented by an arrow 410, where each PDSCH carries 1000 bits. A maximum number of transport blocks that can be scheduled by a single DCI is eight transport blocks and four transport blocks for CE Mode A and CE Mode B respectively.

In order to benefit from "multiple transport block per DCI" scheduling, an amount of information carried by a DCI for "multiple transport block per DCI" scheduling must be smaller than a total of the information carried by the multiple DCIs required for the "single transport block per DCI" scheduling. That is the size of a multi-transport block DCI scheduling eight PDSCHs (or PUSCHs) must be smaller than the total size of eight single-transport block DCIs. Otherwise there is no gain in using multi-transport block DCI. The size of the multi-transport block DCI is kept to a minimum by having all the transport blocks follow a single set of allocation parameters, i.e., the DCI indicates a single repetition level, a single physical resource block (PRB) allocation and a single modulation and coding scheme (MCS) for all the transport blocks. It will be appreciated that reducing the size of the multi-transport block DCI also reduces flexibility in scheduling each of the transport blocks.

Typically data is transmitted on the uplink or downlink in transport blocks using a hybrid automatic repeat request (HARQ) scheme in which positive acknowledgements or negative acknowledgments (ACK/NACK) or HARQ feedback is provided from a receiver (eNB or UE) for the transmitted transport blocks. For multi-transport block scheduling, the HARQ-ACK can be individually transmitted, i.e. one PUCCH allocated for transmitting a HARQ-ACK for each of the transport block or they can be multiplexed into a single PUCCH, for example using HARQ-ACK bundling where an "AND" operation is performed on all the HARQ-ACKs.

Figure 7:
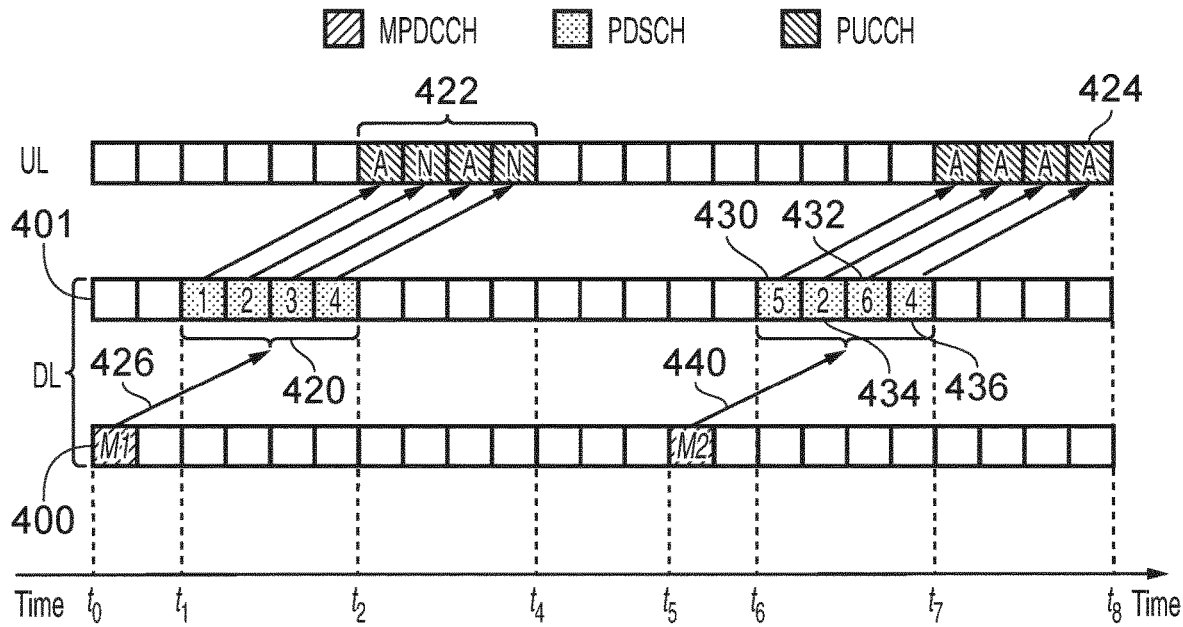
FIG. 7 provides a representation of two example downlink time-divided structures which respectively illustrate transmission/reception of a plurality of downlink control information (DCI) messages in a PDCCH and a transmission/reception of a plurality of transport blocks with a corresponding uplink time-divided structure in which a plurality of ACK/NACK messages are transmitted in response to the transmission/reception of the plurality of transport blocks.

A DCI allocating resources of the PDSCH for Multi-transport blocks can be used for initial transmission and also for retransmissions required following a HARQ-NACK, thereby extending the benefit of multi-transport block DCI for retransmission of multiple transport blocks. It is recognised that not all the transport blocks in the initial transmission require retransmissions and hence it has been proposed that a multi-transport block DCI is able to schedule initial transmissions for some of the transport blocks and retransmissions for other transport blocks all within a single DCI. An example is shown in FIG. 7. An MPDCCH M1 is transmitted to the UE at time $t_0$ in a first part of the downlink 400 providing a DCI M1, which contains a DL grant that schedules four initial PDSCH transport blocks TB {1, 2, 3, 4} with HARQ Process IDs {1, 2, 3, 4} respectively in corresponding time slots 420 of the downlink 401. According to this example, the PDSCHs 420 with HARQ Process ID {1, 3} are successfully decoded whilst the remaining PDSCHs {2, 4} are unsuccessfully decoded. The UE therefore transmits feedback messages (HARQ-ACK/NACK) in four PUCCH 422 of an uplink channel 424 to indicate respectively an ACK A, NACK N, ACK A, NACK N for the corresponding transport blocks transmitted in the PDSCHs 420 for the HARQ Process ID {1, 2, 3, 4} respectively. At time $t_5$, the eNB sends another DCI message in the MPDCCH M2 to the UE providing a downlink grant to schedule transmission of two new transport blocks (initial) in the PDSCH 430, 432. These new transport blocks are labelled "5", 430, and "6", 432, and are transmitted in HARQ Process ID {1, 3}. Transport blocks "2", 434, and "4", 436, are retransmitted in in HARQ Process ID {2, 4} in four successive time slots 438 as represented by an arrow 440. That is the DCI carried by MPDCCH M2 schedules initial transmissions and retransmissions.

A multi-transport block DCI for the retransmission is expected to have the same resource allocation parameters and repetition level as those in the multi-transport block DCI for initial transmission. In [7], it is proposed that a New Data Indicator (NDI) field in the DCI is extended to indicate which transport blocks are initial transmissions and which are retransmissions. This extension may be in the form of a bitmap. The use of a bitmap NDI would mean that the number of transport blocks in the multi-transport block DCI for initial transmissions needs to be the same as that in the multi-transport block DCI for retransmission so that the UE knows exactly which transport block is indicated by the NDI. Hence, it is expected that the same allocation parameters and the number of scheduled transport blocks are used in the multi-transport block DCI scheduling all initial transmissions and the multi-transport block DCI scheduling initial transmissions and retransmissions. Using the example illustrated in FIG. 7, the DCI carried by MPDCCH M1 and MPDCCH M2 both schedule the same repetition number (repeated transmission of the transport block), the same physical resource blocks and the same modulation and coding schemes (MCS) (i.e. same physical transport blocks) and the same number of transport blocks (in this example four PDSCHs). Using consistent or the same communications parameters for transmission for the transport blocks for transmission and retransmission allocated by each DCI message can reduce a complexity with which the transmitter and receiver are implemented. However, there are some disadvantages of using the same communications parameters:

- Since all the transport blocks in a multi-transport block DCI scheduling use the same allocated communications parameters, which result in the same transport blocks, then initial transmissions are forced to use the same transport block size for retransmitted transport blocks as for initial transport blocks. This may not be efficient, for example in FIG. 7, the initial transmission of transport blocks 1, 2, 3, 4 for PDSCH using HARQ Process IDs {1, 2, 3, 4} may use a transport block size of 1000 bits each. Since retransmission of PDSCHs with HARQ Process IDs {2, 4} are scheduled together with new PDSCHs for initial transmission of transport blocks 5 and 6 with HARQ Process IDs {1, 3} using a single DCI carried by MPDCCH M2, the initial transmissions of transport blocks 5 and 6 in PDSCHs using HARQ Process ID {1, 3} are forced to use a transport block size of 1000 bits. If the eNB has only 1200 new data bits to send to the UE at time $t_5$, the eNB could have used a transport block size of 600 bits for the initial transmissions of transport blocks 5 and 6 PDSCH with HARQ Process IDs {1, 3}. However, in this scenario a 1000 bits transport block size is used for transport blocks 5 and 6 PDSCH with HARQ Process IDs {1, 3} resulting in 800 redundant bits which are typically padded bits.
- The eNB or UE may not have further data to transmit but since the same number of transport blocks are used in the initial and retransmission, "dummy" PDSCH or PUSCH are unnecessarily scheduled which are filled with padded bits.

As such, there is a need for an efficient method to handle multi-transport block DCI scheduling of initial transmissions and retransmissions.

Improved Allocation of Shared Channel Resources for Multiple Transport Blocks

Example embodiments can provide a method of receiving data on the downlink by a communications device (UE) or on the uplink by an infrastructure equipment (eNB). For the downlink for example, the method comprises receiving, by the communications device, a plurality of DCI messages, each of the DCI messages providing an indication of communications parameters for the communications device to receive a plurality of transport blocks in communications resource of the downlink of the wireless access interface according to a plurality of hybrid automatic repeat request-type, HARQ, processes. The communications resources of the downlink from which the communications resources can receive the plurality of transport blocks may be communications resources of a downlink shared channel such as for example a PDSCH. The method further comprises receiving, after each received DCI message, one or more of the plurality of transport blocks from the communications resources of the physical downlink shared channel, determining whether data carried by the received one or more transport blocks has been decoded correctly, and transmitting for each of the one or more received transport blocks a HARQ feedback message providing one of an acknowledgement, ACK, or a negative acknowledgement NACK, on an uplink of the wireless access interface according to a corresponding one of the HARQ processes. The one or more received transport blocks may be less than the number of the plurality of transport blocks for which communications resources are allocated, because as will be explained in the example embodiments described below, one or more of the plurality of transport blocks may not be transmitted, because for example, there is no data for that HARQ process to send. The indication of the communications parameters provided by each of the DCI message for the plurality of transport blocks includes an indication of whether each of the plurality of transport blocks is an initial transmission or a retransmission of the transport block according to the corresponding HARQ processes. The receiving, after each received DCI message, includes combining the estimate of whether each of the one or more received transport blocks was decoded correctly for a previous plurality of transport blocks with the indication of the communications parameters for the communications device to receive a subsequent plurality of the transport blocks provided by the DCI message after the determining, to identify a status of the subsequent plurality of the transport blocks to be received.

The status for example can include an indication that one or more of the transport blocks is not transmitted although communications resources will have been allocated because each of the DCI messages provided communications resources for the same number of transport blocks as a multi-transport block allocation.

As will be appreciated from the above explanation, where there is a plurality of DCIs transmitted providing allocation of communications parameters for each of a plurality of transport blocks, some of the transport blocks will be retransmissions and some will be initial transmissions according to HARQ processes. Therefore by combining the communications parameters of a DCI providing communications resources for receiving a plurality of transport blocks with HARQ feedback messages previously provided for one or more transport blocks which have been received, an indication can be provided of the status of the transport blocks which includes whether there is no transmission.

Embodiments of the present technique can provide an improvement in an efficiency with which communications resources are used when an allocation of resources of a shared channel is made using a control information message. This improvement is achieved by controlling an allocation of shared channel resources (PDSCH/PUSCH) to indicate when no transport block is to be transmitted where the same number of transport blocks is allocated for transmission and retransmission by each DCI message.

The indication that no transport block is to be transmitted can be provided by combining information from the feedback messages (HARQ-ACK messages) with the control information from the DCI message (multi-transport block DCI) to determine the status of one or more of the transport blocks scheduled by the control information message (multi-transport block DCI).

As indicated above embodiments are equally applicable to both downlink communication (eNB to UE) and uplink communication (UE to eNB).

According to the example embodiments, a status of each of the one or more scheduled transport blocks in a control information message (multi-transport block DCI) is determined to be:

An initial transmission: i.e. a new PDSCH or PUSCH transport block

A retransmission: i.e. a HARQ retransmission of a PDSCH or PUSCH

No transmission: i.e. there is no transport block transmission

According to example embodiments, in addition to conventional arrangements which indicate whether each transport block is an initial transmission or retransmission, an additional status indication is provided which is that there may be no transmission of a transport block (third bullet of "no transmission"). This solution recognises a drawback of using the same number of transport blocks in both the multi-transport block DCI scheduling the initial transmissions and the multi-transport block DCI scheduling initial transmissions and retransmissions as described above with reference to FIG. 7. The status indication is therefore derived for example from a combination of an ACK/NACK status and an NDI bit, which can therefore provide an indirect indication of "no transmission".

In an example embodiment, the control information in the multi-transport block DCI message includes a New Data Indication (NDI) field such as a bitmap. The NDI field is a bitmap where the length of the bitmap is equal to the number of transport blocks $N_{transport\ block}$ being scheduled by the multi-transport block DCI, which indicates whether the transport block is an initial transmission or retransmission. The NDI bit is combined with the determined HARQ-ACK feedbacks as follows:

HARQ-ACK Feedback=NACK, NDI NOT toggled: transport block is a retransmission

HARQ-ACK Feedback=ACK, NDI is toggled: transport block is an initial transmission (i.e. a new PDSCH)

HARQ-ACK Feedback=ACK, NDI is NOT toggled: No transport block is transmitted

Example embodiments can therefore improve a utilisation of shared channel resources (PDSCH) and can allow an eNB to avoid or reduce wasting communications resource if the number of data bits to be transmitted to the UE is not large enough to use the communications resources otherwise scheduled by the multi-transport block DCI message. An example embodiment is shown in FIG. 8, where corresponding reference numerals identify the same features as FIG. 7.

Figure 8:
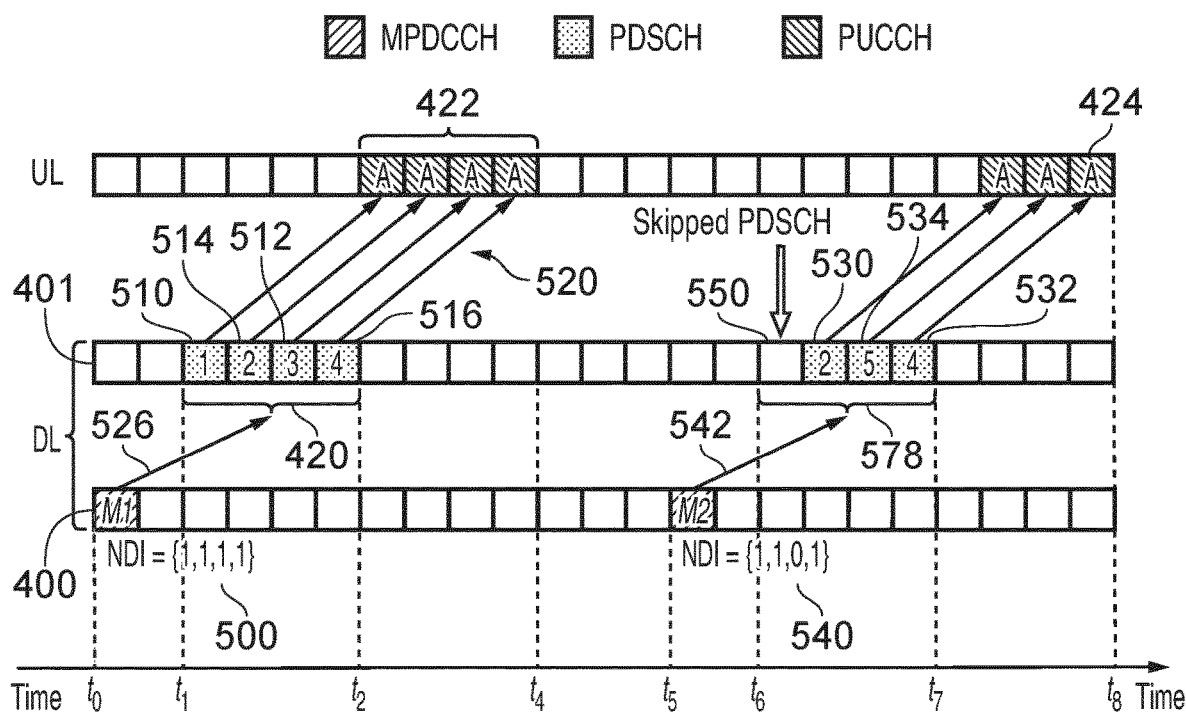
FIG. 8 provides a representation of two example downlink time-divided structures which respectively illustrate transmission/reception of a plurality of downlink control information (DCI) messages in a PDCCH and a transmission/reception of a plurality of transport blocks with a corresponding uplink time-divided structure in which a plurality of ACK/NACK messages are transmitted in response to the transmission/reception of the plurality of transport blocks in which a transport block is skipped according to an example embodiment.

According to the example shown in FIG. 8, at time $t_0$ the eNB has 4000 data bits to send to the UE and uses a single DCI carried by MPDCCH M1 to schedule four new transport blocks {1, 2, 3, 4} using four new PDSCHs 420 with HARQ Process IDs {1, 2, 3, 4} respectively to the UE as represented by an arrow 526. The DCI message M1 of FIG. 8 carries an NDI field, which is set for example to {1, 1, 1, 1} 500.

According to the HARQ processes, a receiver of the UE manages to decode transport blocks 1 and 3 received from the PDSCH with HARQ Process ID {1, 3} 510, 512 whereas it fails to decode transport blocks 2 and 4 received from the PDSCH with HARQ Process ID {2, 4} 514, 516. The UE forms and transmits HARQ feedback messages for corresponding HARQ-ACKs using PUCCH indicating {A, N, A, N} 422 for the estimate of the received transport blocks received from the PDSCH resources with HARQ Process ID {1, 2, 3, 4} respectively as represented by arrows 520.

For this example, the eNB has an additional (new) 600 bits to send to the UE and including the 2000 data bits to retransmit, it has a total of 2600 bits to send to the UE. According to this example embodiment, the eNB is able to transmit these 2600 bits to the UE in three transport blocks, which include two retransmissions of the transport blocks 2 and 4 (530, 532) on the PDSCHs with HARQ Process ID {2, 4} and one transport block (5) which is a new or initial transmission 534 for HARQ Process ID {3}. The eNB then sends a multi-transport block DCI carried by MPDCCH M2 at time $t_5$ to the UE with the NDI field={1, 1, 0, 1} 540 as represented by an arrow 542 which indicates that only the third HARQ process 534 is relates to a PDSCH associated with a new transport block and the rest 530, 532 are associated with retransmissions. According to this example embodiment, since the UE fed back an ACK for the first HARQ process 510, relating to transport block 1, but the corresponding bit of the NDI field did not toggle for that HARQ process 510, the UE recognises that the eNB did not schedule anything for the sub frame 550 corresponding to communications resources of the shared channel allocated for a transport block in the DCI message M2. For the example in FIG. 8, the UE sets its receiver in a light sleep mode during the time-slot 550, because it will not receive a transport block for this time. The time-slot 550 forms part of an anticipated allocation of communications resources of the shared channel 578. The UE therefore detects and decodes the transport blocks transmitted in the PDSCHs 530, 532, 534 where the PDSCHs 530, 532 with HARQ Process ID {2, 4} are retransmissions and the PDSCH 534 with HARQ Process ID {3} is a new transport block (relating to transport block 5). As will be appreciated, the eNB schedules three transport blocks each with 1000 bits giving a capacity of 3000 bits to carry the payload of 2600 bits, where 400 bits of capacity are padded. In contrast, to previously proposed arrangements an eNB would have had to schedule four transport blocks each with 1000 bits giving a capacity of 4000 bits to send 2600 bits thereby padding 1400 bits. Hence, this example embodiment provides a method to use multi-transport block DCI efficiently.

According to another example embodiment, information in the multi-transport block DCI message which is used to indicate a status of a transport block transmission is a redundancy version (RV) field. The RV field is a bit string where the length of the bit string is equal to the product of (1) the number of transport blocks $N_{transport\ block}$ being scheduled by the multi-transport block DCI and (2) the number of bits used to signal each redundancy version of that transport block. It is assumed that a certain RV is used for initial transmissions and other RVs are used for retransmissions (e.g. RV0 is used for initial transmissions and either RV1, RV2 or RV3 are used for re-transmissions). Hence the RV number indicates whether the transport block is an initial transmission or retransmission. The RV field is combined with the determined HARQ-ACK feedback messages as follows:

HARQ-ACK Feedback=NACK, RV>0: transport block is a retransmission

HARQ-ACK Feedback=ACK, RV=0: transport block is an initial transmission (i.e. a new PDSCH)

HARQ-ACK Feedback=ACK, RV>0: No transport block is transmitted

Figure 9:
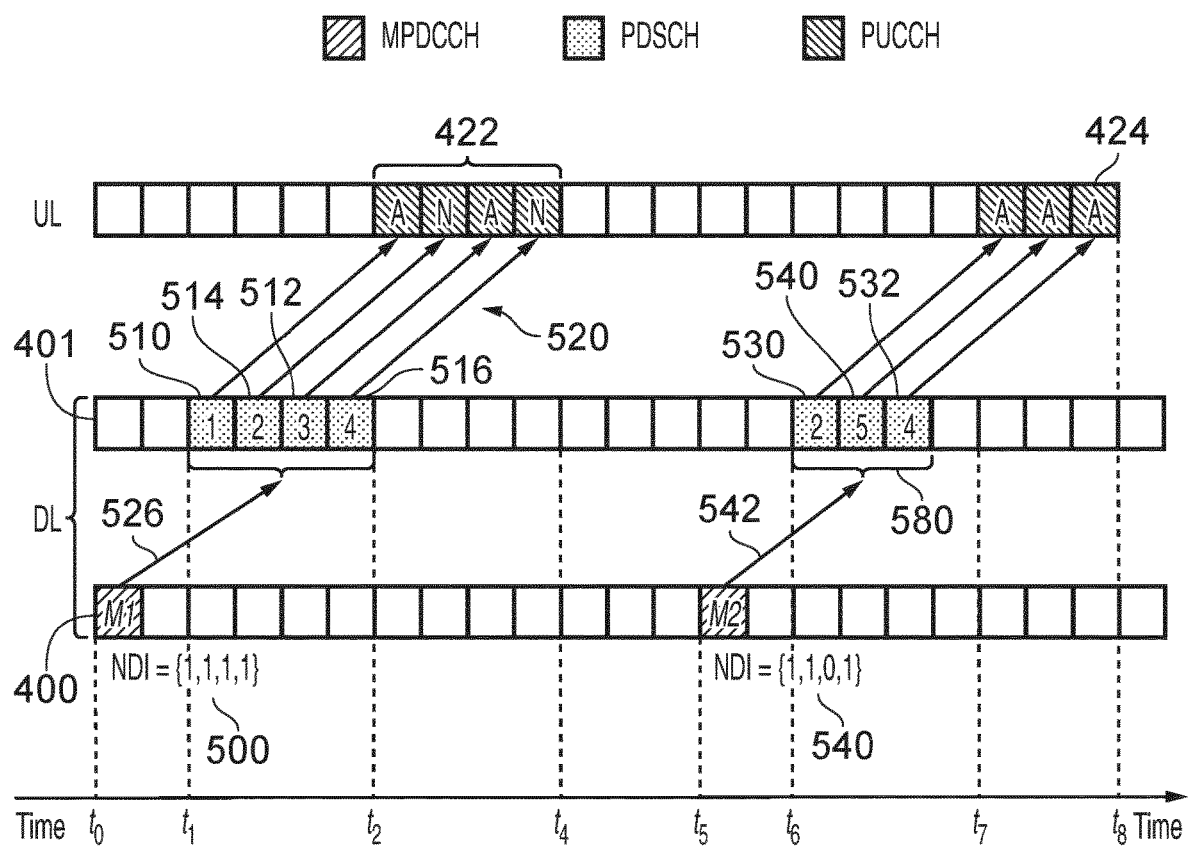
FIG. 9 provides a representation of two example downlink time-divided structures which respectively illustrate transmission/reception of a plurality of downlink control information (DCI) messages in a PDCCH and a transmission/reception of a plurality of transport blocks with a corresponding uplink time-divided structure in which a plurality of ACK/NACK messages are transmitted in response to the transmission/reception of the plurality of transport blocks and in which a transport block is skipped according to an example embodiment.

According to an example embodiment, skipped transport blocks, which are not transmitted in an otherwise allocated PDSCH are not transmitted and the other transport blocks are transmitted in the allocated PDSCH back-to-back, as illustrated in an example embodiment shown in FIG. 9. FIG. 9 illustrates the same scenario as FIG. 8, but in this case the UE does not "pause" while skipping a PDSCH transmission, it instead decodes the next PDSCH that is known to be active. Hence a contiguous period of shared resources of the downlink 580 for which the UE activates its receiver only includes three time-slots 580 in comparison to the four time-slots 578 which were anticipated in FIG. 8. Accordingly, when the UE pauses decoding according to the example in FIG. 8, the UE can enter a light sleep mode.

While operating in a light sleep mode is preferable to active decoding, light sleep mode still consumes power. By eliminating the pause in FIG. 9, the UE can save battery power since the amount of time that the UE operates in light sleep mode is reduced.

Uplink Example Embodiments

Figure 10:
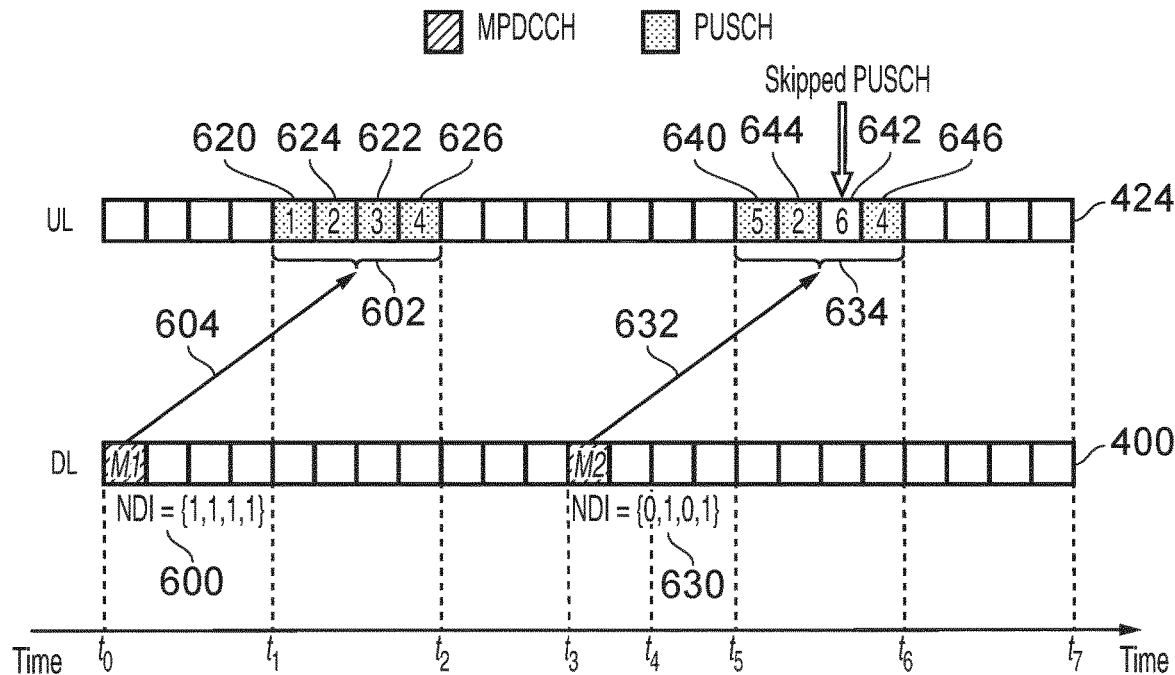
FIG. 10 provides a representation of two example downlink time-divided structures which respectively illustrate transmission/reception of a plurality of downlink control information (DCI) messages in a PDCCH each allocating communications resources for a plurality of transport blocks in which a transport block is skipped according to an example embodiment.
Figure 11:
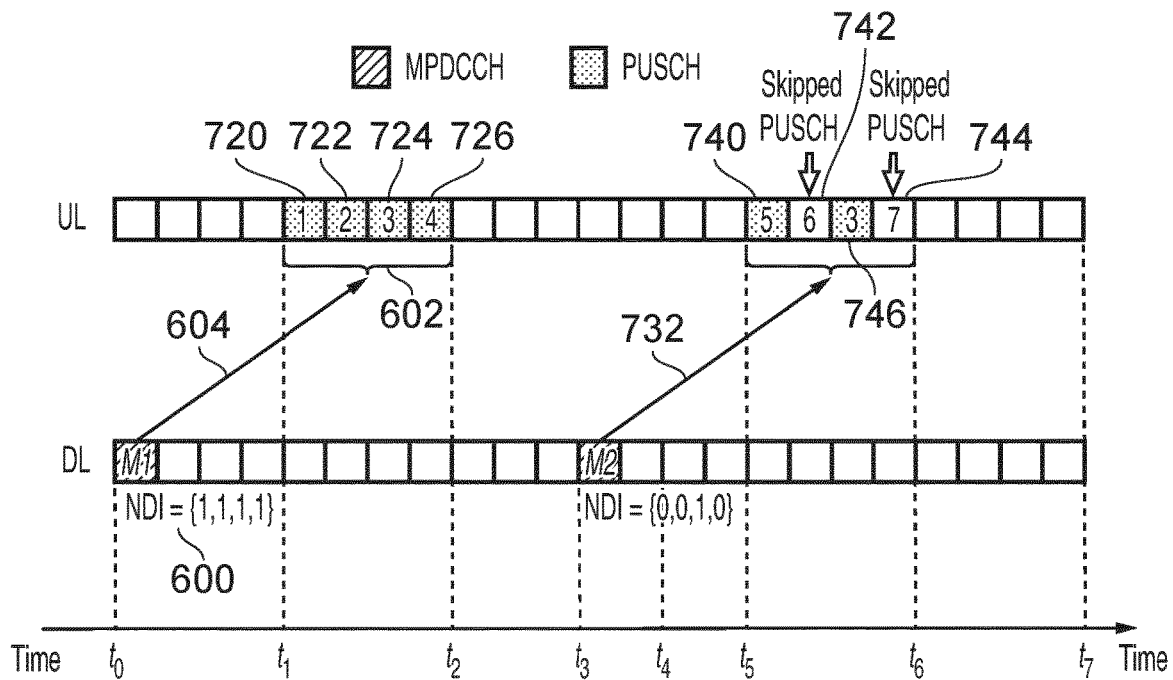
FIG. 11 provides a representation of two example downlink time-divided structures which respectively illustrate transmission/reception of a plurality of downlink control information (DCI) messages in a PDCCH each allocating communications resources for a plurality of transport blocks in which a transport block is skipped according to an example embodiment.

FIGS. 10 and 11 consider example embodiments in respect of uplink transmissions from the UE to the eNB which otherwise correspond to the downlink example embodiments explained above. For an example of the uplink, if a UE has detected that a transport block is not to be transmitted, then the UE may be configured to skip any NEW PUSCH in a multi-transport block UL grant. That is the UE does not need to send a transport block with padded bits to the eNB if it does not have data to transmit even when the eNB has scheduled the UE the PUSCH resource. An example is shown in FIG. 10.

For the example shown in FIG. 10, a UE has 4000 bits to transmit to an eNB. The UE therefore receives a multi-transport block uplink grant carried by MPDCCH M1 at time $t_0$ from the eNB on the downlink 400 which schedules resources for four transport blocks 602 in PUSCH resources with HARQ Process IDs {1, 2, 3, 4}, as represented by an arrow 604 where each PUSCH allocated resource in a corresponding time-slot has a 1000 bits capacity. The eNB sets the NDI={1, 1, 1, 1} 600 provided in the downlink control information for the resources granted in the PUSCH. The UE uses these four PUSCH 602 to clear its buffer of 4000 bits. In this example, the eNB manages successfully to decode the data carried by transport blocks carried in the PUSCH 620, 622 with HARQ Process ID {1, 3} but failed to decode the transport blocks carried in the PUSCH 624, 626 with HARQ Process ID {2, 4}. The eNB therefore then sends another multi-transport block UL grant using MPDCCH M2 to the UE at time $t_3$ with NDI={0, 1, 0, 1} 630 thereby requesting a retransmission of the transport blocks carried in the PUSCH 624, 626 with HARQ Process ID {2, 4} and provides two new PUSCH for transmitting transport blocks (5,6) on the uplink with HARQ Process ID {1, 3} as represented by an arrow 632. In addition to the remaining 2000 bits to retransmit, another 500 bits arrives at a buffer of the UE giving a total of 2500 bits to transmit. The uplink grant carried by MPDCCH M2 allocated four PUSCH 634 each with a capacity for carrying 1000 bits to the eNB. According to this example embodiment, one of the new PUSCH allocations of resources for transmitting the two new transport blocks on the uplink with HARQ Process ID {1, 3} 640, 642 (for potential transport blocks 5, 6) can be skipped and this allows the UE to use three of the PUSCH resources for transmitting the remaining transport blocks 640, 644, 646 (instead of all four PUSCH transport blocks) to transmit its data, which comprises transport blocks 644, 646 to retransmit PUSCH with HARQ Process ID {2, 4} and a new PUSCH 640 with HARQ Process ID {1} to transmit the newly arrived 500 bits in transport block 5. The UE skips transmission of PUSCH with HARQ Process ID {3} (i.e. the UE does not transmit a transport block 6). Although the new PUSCH resources are already allocated for the UE, by not transmitting a PUSCH, the UE saves power and reduces interference. As will be appreciated, the eNB will need to detect whether there is a transmission in any new PUSCH.

According to this example embodiment the new transport block (transport block 5) transmitted in the new PUSCH 640 is transmitted in HARQ process 1 and the transmission in HARQ process 3 (for transmission of a transport block 6) is skipped. It will be understood therefore that HARQ processes 1 and 3 could be re-used because the first NDI bit is toggled, informing the UE that HARQ process 1 is now free for a new initial transmission.

In another example embodiment, which corresponds to the example embodiment explained above for the downlink, the RV is used to indicate whether a new PUSCH is being scheduled or not. For example, based on the example of FIG. 10, at $t_0$, MPDCCH M1 could indicate use of RVs {0, 0, 0, 0}, indicating new initial transmissions. The eNB then sends another multi-transport block UL grant using MPDCCH M2 to the UE at time $t_3$ with RVs={0, 1, 0, 1} thereby requesting for a retransmission of PUSCH with HARQ Process ID {2, 4}. These are indicated as re-transmissions because RV=1 is signaled, or more generally an RV other than RV=0 is signaled. This indicates that two new PUSCH are provided with HARQ Process ID {1, 3} (these are new transmissions because RV=0 is signaled). The UE can then transmit or skip PUSCH using HARQ process ID {1, 3}, as per the description in the above embodiment. It should be appreciated that although in this example the initial RV is 0 and retransmission used RV>0, the initial RV can be another number but follow a known sequence, e.g. {2, 1, 3, 0} can be one sequence where the initial transmission uses RV=2, $1^{st}$ retransmission uses RV=1, $2^{nd}$ retransmission uses RV=3 & $3^{rd}$ retransmission uses RV=0, and so the UE can identify whether an RV number is for initial transmission or for a retransmission.

In another embodiment, the UE and eNB both know the buffer status at the UE (e.g. via buffer status report signaling between the UE and eNB). In this case, both the UE and eNB know how many PUSCH will be transmitted by the UE. In this case, the skipped PUSCH of FIG. 10 can be eliminated and the PUSCH can be transmitted in a back-to-back manner as can be understood from FIGS. 9 and 10 and the above explanation.

In another embodiment, the UE multiplexes new data onto new PUSCH according to the order the PUSCH is scheduled. That is any new data is multiplexed into new PUSCH first and once the buffer is cleared, the UE skips the remaining new PUSCH. An example is shown in FIG. 11, which is based on the example shown in FIG. 10 so only the differences will be described.

As shown in FIG. 11, at time $t_0$, the eNB schedules four PUSCHs 602 with HARQ Process ID {1, 2, 3, 4} to a UE that has 4000 bits of data to transmit. The NDI in this UL grant is set to {1, 1, 1, 1} 600. The eNB successfully decodes PUSCH with HARQ Process ID {1, 2, 4} 720, 722, 726 but fails to decode the transport block carried by the PUSCH 724 with HARQ Process ID {3}. The eNB then requests for a retransmission of the transport block carried by the PUSCH 724 with HARQ Process ID {3} and also schedules resources for new PUSCH transmissions using a multi-transport block DCI carried by MPDCCH M2 at time $t_3$. The NDI is therefore set to {0, 0, 1, 0} 730 indicating that the first, second and fourth HARQ processes relate to new PUSCH allocations whilst the third transport block is for retransmission. According to this embodiment, assuming that the UE has new data of 500 bits to transmit, the UE will first use the first PUSCH 740 with HARQ Process ID {1} to multiplex these new 500 bits into a transport block (transport block 5) transmitted in the first PUSCH 740 before it considers the next PUSCH. Since it has cleared its buffer, it does not use the second and fourth new PUSCH 742, 744 and therefore skips them. This has the benefit that the eNB does not need to decode the fourth PUSCH 744 with HARQ Process ID {4} if it received nothing in the second PUSCH 742 with HARQ Process ID {2} since the eNB knew that the UE would multiplex any new data according to the order of arrival of the PUSCH. Hence this embodiment reduces blind decoding at the eNB. The UE however transmits the transport block for the HARQ process ID={3} as a retransmission in the third PUSCH 746.

According to the examples provided in FIGS. 10 and 11 for uplink transmission of data to a wireless communications network, according to one example a UE receives a first DCI message (M1), the first DCI message (M1) providing an indication of communications parameters for the UE to transmit a first plurality of transport blocks in communications resources of an uplink of a wireless access interface according to a plurality of hybrid automatic repeat request-type, HARQ, processes. The UE transmits, after receiving the first DCI message (M1), the first plurality of transport blocks in the communications resources of the uplink, and receives in response on a downlink of the wireless access interface, for each of the one or more transmitted first plurality of transport blocks a HARQ feedback message providing one of an acknowledgement, ACK, or a negative acknowledgement NACK, according to a corresponding one of the HARQ processes, the HARQ feedback indicating whether each of the transmitted first plurality of transport blocks was decoded correctly. The UE receives a second DCI message (M2) providing an indication of communications parameters for the UE to transmit a second plurality of transport blocks in communications resource of the uplink according to the plurality of hybrid automatic repeat request-type, HARQ, processes. The UE then determines from each of the received HARQ feedback messages whether each of the second plurality of transport blocks is to be a retransmission of a transport block from the first plurality of transport blocks or whether the transport block can be used for an initial transmission of a new transport block, and based on an amount of uplink data for transmission by the UE, the UE does not transmit a transport block in one or more of the second plurality of transport blocks which are determined for use for an initial transmission or transmits in only a part of communications resources provided for a transport block determined for use for an initial transmission.

In some examples, the UE transmits the retransmission of the one or more transport blocks from the first plurality of transport blocks and the initial transmission of the one or more transport blocks or part transport blocks in a section of continuous communications resources, the one or more of the second plurality of transport blocks which are not used or used in part of communications resources provided for a transport block being formed as a continuous section of communications resources in which there is no transmission. Both the US and the eNB can therefore save power when transmitting or receiving.

As will be appreciated from the above example embodiments, in contrast to previously proposed arrangements a multi-transport block DCI for retransmissions and the multi-transport block DCI for initial transmissions use the same communications parameters to allocate resources, which would lead to under-utilised transport block resources. According to the above described embodiments an eNB or a UE can skip transmission/reception of PDSCH or PUSCH whilst still using the same communications parameters to allocate resources for both the multi-transport block DCI for retransmissions and initial transmissions.

Summary of Operation

Figure 12:
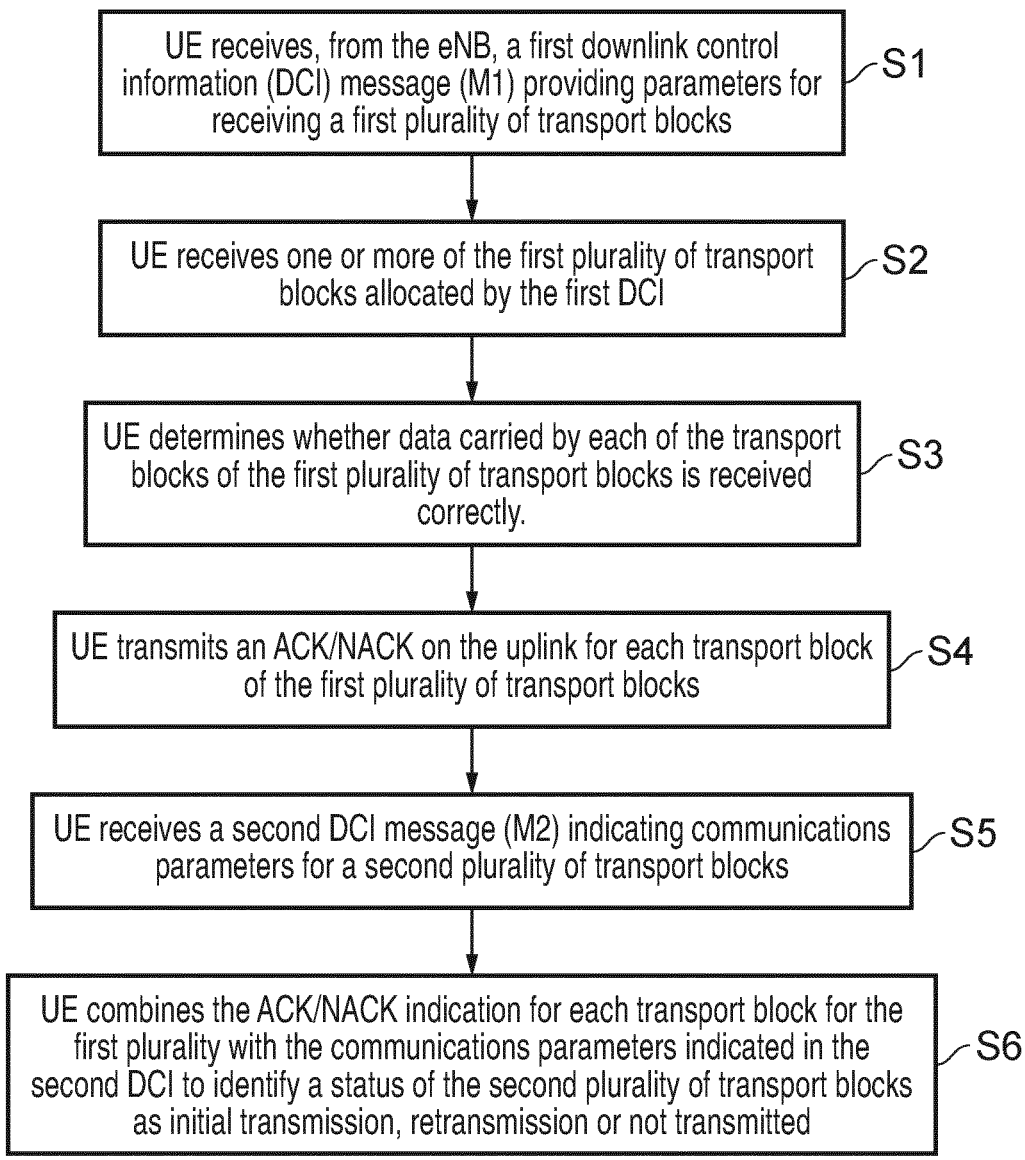
FIG. 12 is a flow diagram illustrating an example method performed by a communications device (UE) to receive data using HARQ processes according to an example embodiment of the present technique.

FIG. 12 shows a flow diagram illustrating a process of communications in a communications system in accordance with embodiments of the present technique. The example shown in FIG. 12 shows a method of operating a communications device configured to receive data from an infrastructure equipment of a wireless communications network on the downlink.

The method begins in step S1. As a first step S1, the communications device (UE) receives, in a downlink of a wireless access interface formed by the wireless communications network, a first DCI message. The first DCI message provides an indication of communications parameters for the UE to receive a first plurality of transport blocks in communications resource of the downlink of the wireless access interface according to a plurality of hybrid automatic repeat request-type, HARQ, processes. The downlink in which the communications resources are provided to receive the transport blocks on the downlink may be provided in a shared channel, such as a PDSCH as explained above. The DCI message is therefore a multi-TB DCI, so that the first DCI provides communications parameters for receiving a plurality of transport blocks from the PDSCH. In a Hybrid ARQ-type process, some of the transport blocks may be an initial transmission of a transport block as a first attempt transmission, whereas others of the transport blocks may be retransmissions according to the Hybrid ARQ-type process. As will be appreciated, in a typical scenario transmission of data will require repeated transmission of DCI messages each of which is providing communications parameters including communications resources for a plurality of transport blocks, some of which are used for initial transmissions and some of which are for retransmissions. The same number of transport blocks is allocated by each DCI message, to reduce implementation complexity, but with the effect that some of the capacity provided by those communications resources may go un-used depending on a buffer status of the UE.

In step S2, the UE receives, after receiving the first DCI message, one or more of the first plurality of transport blocks from the communications resources of the downlink identified by the first DCI message. In step S3 the UE determines whether data carried by the received one or more of the first plurality transport blocks has been decoded correctly, and according to the determination generates an acknowledgement, ACK, or a negative acknowledgement NACK, message according to the HARQ process. The UE then transmits in step S4 for each of the one or more received transport blocks of the first plurality of transport blocks the generated HARQ feedback message providing one of the ACK or NACK message on an uplink of the wireless access interface according to the corresponding one of the HARQ processes.

In step S5 the UE receives a second DCI message (M2) providing an indication of communications parameters for the UE to receive a second plurality of transport blocks in communications resource of the downlink according to the plurality of hybrid automatic repeat request-type, HARQ, processes. According to the example embodiments the indication of the communications parameters provided by the first and second DCI message for the first and second plurality of transport blocks includes an indication of whether each transport block in the first and second plurality of transport blocks respectively is an initial transmission or a retransmission of the transport block according to the corresponding HARQ processes. For the example of the DCI messages carrying NDI bits, the NDI bits indicate whether the individual transport blocks are initial transmission or re-transmissions. The NDI bits do not refer to the plurality of transport blocks as a whole, but each bit is used to infer a status of each transport block.

In step S6, the UE combines the determination of whether each of the one or more received transport blocks of the first plurality of transport blocks was decoded correctly with the indication of the communications parameters for the UE to receive the second plurality of the transport blocks provided by the second DCI message, to identify a status of the second plurality of the transport blocks to be received. The status can be one of an initial transmission of a transport block, a re-transmission of a transport block or no transmission. As such DCI M2 can provide an indication that one or more of the transport blocks out of the plurality are not transmitted. As will be appreciated, the number of the one or more transport blocks received for each multi-transport block allocation by a DCI message may be less than the total number of transport blocks allocated, because one or more of the plurality of transport blocks may not have been transmitted by the eNB.

According to the above explained example embodiments, a method of operating a communications device configured to receive data from a wireless communications network comprises receiving, by the communications device, in a downlink of a wireless access interface formed by the wireless communications network, a plurality of downlink control information messages (M1, M2), each of the downlink control information messages (M1, M2) providing an indication of communications parameters for the communications device to receive a plurality of transport blocks in communications resource of the downlink of the wireless access interface according to a plurality of hybrid automatic repeat request-type, HARQ, processes, receiving, after each received downlink control information message (M1, M2), one or more of the plurality of transport blocks from the communications resources of the downlink, determining whether data carried by the received one or more transport blocks has been decoded correctly, and transmitting for each of the one or more received transport blocks a HARQ feedback message providing one of an acknowledgement, ACK, or a negative acknowledgement NACK, on an uplink of the wireless access interface according to a corresponding one of the HARQ processes, wherein the indication of the communications parameters provided by each downlink control information message (M1, M2) for the plurality of transport blocks includes an indication of whether each of the plurality of transport blocks is an initial transmission or a retransmission of the transport block according to the corresponding HARQ processes, and the receiving, after each received downlink control information message, the one or more of the plurality of transport blocks from the communications resources of the downlink includes combining the estimate of whether each of the one or more received transport blocks was decoded correctly for a previous plurality of transport blocks with the indication of the communications parameters for the communications device to receive a subsequent plurality of the transport blocks provided by the downlink control information message after the determination, to identify a status of the subsequent plurality of the transport blocks to be received.

Those skilled in the art would appreciate that the method shown by FIG. 12 may be adapted in accordance with embodiments of the present technique for communicating data on the uplink as well as the downlink. For example, other intermediate steps may be included in the method, or the steps may be performed in any logical order.

Though embodiments of the present technique have been described largely by way of the example communications system shown in FIGS. 1 to 12, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device configured to receive data from a wireless communications network, the method comprising receiving, by the communications device, in a downlink of a wireless access interface formed by the wireless communications network, a first downlink control information message (M1), the first downlink control information message (M1) providing an indication of communications parameters for the communications device to receive a first plurality of transport blocks in communications resources of the downlink of the wireless access interface according to a plurality of hybrid automatic repeat request-type, HARQ, processes, receiving, after receiving the first downlink control information message (M1), one or more of the first plurality of transport blocks from the communications resources of the downlink, determining whether data carried by the received one or more of the first plurality transport blocks has been decoded correctly, transmitting for each of the one or more received transport blocks a HARQ feedback message providing one of an acknowledgement, ACK, or a negative acknowledgement NACK, on an uplink of the wireless access interface according to a corresponding one of the HARQ processes, and receiving, by the communications device, a second downlink control information message (M2) providing an indication of communications parameters for the communications device to receive a second plurality of transport blocks in communications resources of the downlink according to the plurality of hybrid automatic repeat request-type, HARQ, processes, wherein the indication of the communications parameters provided by the second downlink control information message (M2) for receiving the second plurality of transport blocks includes an indication of whether each of the second plurality of transport blocks is an initial transmission or a retransmission of the transport block according to the corresponding HARQ processes, and combining the determination of whether each of the one or more received transport blocks of the first plurality of transport blocks was decoded correctly with the indication of the communications parameters for the communications device to receive the second plurality of the transport blocks provided by the second downlink control information message, to identify a status of the second plurality of the transport blocks to be received.

Paragraph 2. The method according to paragraph 1, wherein each of the first and second downlink control channel messages (M1, M2) provide the communications parameters for the same number of transport blocks for the first plurality of transport blocks and the second plurality of transport blocks.

Paragraph 3. The method according to paragraph 1 or 2, wherein the status of the second plurality of the transport blocks to be received is one of an initial transmission, a retransmission or not being transmitted.

Paragraph 4. The method according to paragraph 1, 2 or 3, wherein the combining the determination of whether each of the one or more transport blocks of the first plurality of transport blocks was decoded correctly with the indication of the communications parameters provided by the second downlink control information message, includes identifying one or more of the second plurality of transport blocks to be received which will not be transmitted, a number of the one or more transport blocks to be received for the second plurality of transport blocks being lower than the number of each of the first and the second plurality of transport blocks for which the first and second downlink control message is received respectively.

Paragraph 5. The method according to any of paragraphs 1 to 4, wherein the indication of the communications parameters provided by each of the first and second downlink control information messages includes for each of the transport blocks of the first and second plurality of transport blocks indicated by the first and second downlink control information messages a binary digit, which is used to indicate whether each of the transport blocks of the first and second plurality of transport blocks is either an initial transmission of a transport block according to a HARQ process or a retransmission of the transport block for the HARQ process, and the combining the determination of whether each of the one or more transport blocks of the first plurality of transport blocks was decoded correctly with the indication of the communications parameters provided by the second downlink control information message, includes identifying that one or more of the second plurality of transport blocks will not be transmitted by identifying that the binary digit for the one or more transport blocks with respect to the first downlink control information message for these one or more transport blocks has not changed and that the one or more transport blocks received with the first plurality of transport blocks were determined to have been decoded correctly.

Paragraph 6. The method according to paragraph 5, wherein the binary digit provided for each of the first and second plurality of transport blocks in the first and second downlink control information messages forms part of a New Data Indication, NDI, field.

Paragraph 7. The method according to any of paragraphs 1 to 4, wherein the indication of the communications parameters provided by each of the first and second downlink control information messages includes for each of the first and second plurality of transport blocks an indication of a redundancy version providing a version of the data of the transport block, and the combining the estimate of whether each of the one or more transport blocks of the first plurality of transport blocks was decoded correctly with the indication of the communications parameters for the second downlink control information message, includes identifying that one or more of the transport blocks of the second plurality of transport blocks will not be transmitted by identifying that the redundancy version is not the initial version and that those one or more transport blocks of the second plurality of transport blocks was decoded correctly.

Paragraph 8. The method according to any of paragraphs 4 to 7, comprising after identifying, from the combination of the communications parameters of the second downlink control information message and the determination of whether the one or more received transport blocks of the first plurality of transport blocks were decoded correctly, that one or more of the transport blocks of the second plurality of transport blocks will not be transmitted, controlling a receiver of the communications device to reduce power for one period of the communications resources of the downlink channel in which the one or more transport blocks of the second plurality of transport blocks are not transmitted and to increase power to the receiver in another period of the communications resources in which others of the second plurality of transport blocks are transmitted to receive the others of the second plurality of transport blocks.

Paragraph 9. The method according to paragraph 8, wherein the one period in which the power to the receiver is reduced and the other period in which the power to the receiver is increased are continuous in time, the one or more transport blocks of the second plurality of transport blocks which are to be transmitted being grouped into continuous communications resources.

Paragraph 10. A method of operating an infrastructure equipment forming part of a wireless communications network configured to transmit data to a communications device, the method comprising transmitting, by the infrastructure equipment, in a downlink of a wireless access interface formed by the wireless communications network, a first downlink control information message, providing an indication of communications parameters for a communications device to receive a first plurality of transport blocks in communications resources of the downlink according to a plurality of hybrid automatic repeat request-type, HARQ, processes, and receiving, by the infrastructure equipment from the communications device for each of the one or more transmitted first plurality of transport blocks a HARQ feedback message providing one of an acknowledgement, ACK, or a negative acknowledgement NACK, on an uplink of the wireless access interface according to a corresponding one of the HARQ processes, the HARQ feedback messages being generated after determining whether each of the one or more transmitted first plurality of transport blocks was decoded correctly, and transmitting, by the infrastructure equipment, in a downlink of a wireless access interface, a second downlink control information message, providing an indication of communications parameters for a communications device to receive a second plurality of transport blocks in communications resources of the downlink according to a plurality of hybrid automatic repeat request-type, HARQ, processes, wherein the indication of the communications parameters provided by the second downlink control information message for each of the second plurality of transport blocks includes an indication of whether each of the second plurality of transport blocks is an initial transmission or a retransmission of the transport block according to the corresponding HARQ processes, and the indication of the communications parameters for the communications device to receive a subsequent second plurality of the transport blocks provided by the second downlink control information message is arranged to identify, to the communications device, a status of the subsequent second plurality of the transport blocks to be received when combined by the communications device with the determination of whether each of the one or more transmitted transport blocks of the first plurality of transport blocks was decoded correctly for which the received HARQ feedback message was generated.

Paragraph 11. A method of operating a communications device to receive data from a wireless communications network, the method comprising
 receiving, by the communications device, in a downlink of a wireless access interface formed by the wireless communications network, a plurality of downlink control information messages (M1, M2), each of the downlink control information messages (M1, M2) providing an indication of communications parameters for the communications device to receive a plurality of transport blocks in communications resources of the downlink of the wireless access interface according to a plurality of hybrid automatic repeat request-type, HARQ, processes,
 receiving, after each received downlink control information message (M1, M2), one or more of the plurality of transport blocks from the communications resources of the downlink, determining whether data carried by the received one or more transport blocks has been decoded correctly, and
 transmitting for each of the one or more received transport blocks a HARQ feedback message providing one of an acknowledgement, ACK, or a negative acknowledgement NACK, on an uplink of the wireless access interface according to a corresponding one of the HARQ processes, wherein the indication of the communications parameters provided by each downlink control information message (M1, M2) for the plurality of transport blocks includes an indication of whether each of the plurality of transport blocks is an initial transmission or a retransmission of the transport block according to the corresponding HARQ processes, and the receiving the one or more of the plurality of transport blocks, after each received downlink control information message, includes
 combining the estimate of whether each of the one or more received transport blocks was decoded correctly for a previous plurality of transport blocks with the indication of the communications parameters for the communications device to receive a subsequent plurality of the transport blocks provided by the downlink control information message after the estimate, to identify one or more of the subsequent plurality of transport blocks which are not transmitted, a number of the one or more transport blocks being detected for each received downlink control information message varying.

Paragraph 12. A method of operating a communications device to transmit data to a wireless communications network, the method comprising
 receiving, by the communications device, in a downlink of a wireless access interface formed by the wireless communications network, a first downlink control information message (M1), the first downlink control information message (M1) providing an indication of communications parameters for the communications device to transmit a first plurality of transport blocks in communications resources of an uplink of a wireless access interface according to a plurality of hybrid automatic repeat request-type, HARQ, processes,
 transmitting, after receiving the first downlink control information message (M1), the first plurality of transport blocks in the communications resources of the uplink, receiving on a downlink of the wireless access interface, by the communications device, for each of the one or more transmitted first plurality of transport blocks a HARQ feedback message providing one of an acknowledgement, ACK, or a negative acknowledgement NACK, according to a corresponding one of the HARQ processes, the HARQ feedback indicating whether each of the transmitted first plurality of transport blocks was decoded correctly,
 receiving, by the communications device, a second downlink control information message (M2) providing an indication of communications parameters for the communications device to transmit a second plurality of transport blocks in communications resource of the uplink according to the plurality of hybrid automatic repeat request-type, HARQ, processes,
 determining from each of the received HARQ feedback messages whether each of the second plurality of transport blocks is to be a retransmission of a transport block from the first plurality of transport blocks or whether the transport block can be used for an initial transmission of a new transport block, and
 based on an amount of uplink data for transmission by the communications device, not transmitting a transport block in one or more of the second plurality of transport blocks which are determined for use for an initial transmission or transmitting data in only a part of communications resources provided for a transport block determined for use for an initial transmission in one or more of the second plurality of transport blocks.

Paragraph 13. A method of operating a communications device of paragraph 12, comprising transmitting the retransmission of the one or more transport blocks of the first plurality of transport blocks, and
 transmitting data in one or more transport blocks of the second plurality of transport blocks, which are not being used for retransmission, as one of an initial transmission of a transport block or transmitting data as a part transmission of a transport block, wherein the transmitting the retransmission of the one or more transport blocks from the first plurality of transport blocks and the initial transmission of the one or more transport blocks or part transport blocks is adapted to be continuous in time, the one or more of the second plurality of transport blocks which are not used or used in part of communications resources provided for a transport block being formed as a continuous section of communications resources in which there is no transmission.

Paragraph 14. A method of operating an infrastructure equipment forming part of a wireless communications network configured to receive data from a communications device, the method comprising
 transmitting, by the infrastructure equipment, in a downlink of a wireless access interface formed by the wireless communications network, a first downlink control information message, providing an indication of communications parameters for a communications device to transmit a first plurality of transport blocks in communications resources of the uplink according to a plurality of hybrid automatic repeat request-type, HARQ, processes, and receiving, by the infrastructure equipment from the communications device one or more of the first plurality of transport blocks, determining whether each of the first plurality of transport blocks was decoded correctly, and transmitting a HARQ feedback message providing one of an acknowledgement, ACK, or a negative acknowledgement NACK, on a downlink of the wireless access interface according to a corresponding HARQ process, and transmitting, by the infrastructure equipment, in a downlink of a wireless access interface, a second downlink control information message, providing an indication of communications parameters for a communications device to transmit one or more of a second plurality of transport blocks in communications resources of the uplink according to a plurality of hybrid automatic repeat request-type, HARQ, processes, wherein the indication of the communications parameters provided by the second downlink control information message for each of the second plurality of transport blocks includes an indication of whether each of the second plurality of transport blocks is an initial transmission or a retransmission of the transport block according to the corresponding HARQ processes, and determining for each of the second plurality of transport blocks that are indicated as initial transmission whether the communications device has transmitted a transport block.

Paragraph 15. A communications device for receiving data from a wireless communications network, the communications device comprising receiver circuitry for receiving on a downlink of a wireless access interface formed by the wireless communications network, transmitter circuitry for transmitting on an uplink of the wireless access interface, and controller circuitry configured to control the receiver circuitry and the transmitter circuitry, and the controller circuitry is configured with the receiver circuitry and the transmitter circuitry to receive a first downlink control information message (M1), the first downlink control information message (M1) providing an indication of communications parameters for the communications device to receive a first plurality of transport blocks in communications resources of the downlink of the wireless access interface according to a plurality of hybrid automatic repeat request-type, HARQ, processes, to receive, after receiving the first downlink control information message (M1), one or more of the first plurality of transport blocks from the communications resources of the downlink, to determine whether data carried by the received one or more of the first plurality transport blocks has been decoded correctly, to transmit for each of the one or more received transport blocks a HARQ feedback message providing one of an acknowledgement, ACK, or a negative acknowledgement NACK, on an uplink of the wireless access interface according to a corresponding one of the HARQ processes, and to receive, by the communications device, a second downlink control information message (M2) providing an indication of communications parameters for the communications device to receive a second plurality of transport blocks in communications resources of the downlink according to the plurality of hybrid automatic repeat request-type, HARQ, processes, wherein the indication of the communications parameters provided by the second downlink control information message (M2) for receiving the second plurality of transport blocks includes an indication of whether each of the second plurality of transport blocks is an initial transmission or a retransmission of the transport block according to the corresponding HARQ processes, and to combine the determination of whether each of the one or more received transport blocks of the first plurality of transport blocks was decoded correctly with the indication of the communications parameters for the communications device to receive the second plurality of the transport blocks provided by the second downlink control information message, to identify a status of the second plurality of the transport blocks to be received.

Paragraph 16. A communications device for receiving data from a wireless communications network, the communications device comprising receiver circuitry for receiving on a downlink of a wireless access interface formed by the wireless communications network, transmitter circuitry for transmitting on an uplink of the wireless access interface, and controller circuitry configured to control the receiver circuitry and the transmitter circuitry, and the controller circuitry is configured with the receiver circuitry and the transmitter circuitry to receive in a downlink of a wireless access interface formed by the wireless communications network, a first downlink control information message (M1), the first downlink control information message (M1) providing an indication of communications parameters for the communications device to transmit a first plurality of transport blocks in communications resources of an uplink of a wireless access interface according to a plurality of hybrid automatic repeat request-type, HARQ, processes, to transmit, after receiving the first downlink control information message (M1), the first plurality of transport blocks in the communications resources of the uplink, to receive on a downlink of the wireless access interface, by the communications device, for each of the one or more transmitted first plurality of transport blocks a HARQ feedback message providing one of an acknowledgement, ACK, or a negative acknowledgement NACK, according to a corresponding one of the HARQ processes, the HARQ feedback indicating whether each of the transmitted first plurality of transport blocks was decoded correctly, to receiving a second downlink control information message (M2) providing an indication of communications parameters for the communications device to transmit a second plurality of transport blocks in communications resource of the uplink according to the plurality of hybrid automatic repeat request-type, HARQ, processes, to determine from each of the received HARQ feedback messages whether each of the second plurality of transport blocks is to be a retransmission of a transport block from the first plurality of transport blocks or whether the transport block can be used for an initial transmission of a new transport block, and to determine, based on an amount of uplink data for transmission by the communications device, not to transmit a transport block in one or more of the second plurality of transport blocks which are determined for use for an initial transmission or to transmit data in only a part of communications resources provided for a transport block determined for use for an initial transmission in one or more of the second plurality of transport blocks.

Paragraph 17. Infrastructure equipment forming part of a wireless communications network, the infrastructure equipment comprising transmitter circuitry for transmitting on a downlink of a wireless access interface formed with the wireless communications network to one or more communications devices, receiver circuitry for receiving on an uplink of the wireless access interface from the one or more communications devices, and controller circuitry configured to control the receiver circuitry and the transmitter circuitry, and the controller circuitry is configured with the receiver circuitry and the transmitter circuitry to transmit in a downlink of a wireless access interface formed by the wireless communications network, a first downlink control information message, providing an indication of communications parameters for a communications device to receive a first plurality of transport blocks in communications resources of the downlink according to a plurality of hybrid automatic repeat request-type, HARQ, processes, to receive, by the infrastructure equipment from the communications device for each of the one or more transmitted first plurality of transport blocks a HARQ feedback message providing one of an acknowledgement, ACK, or a negative acknowledgement NACK, on an uplink of the wireless access interface according to a corresponding one of the HARQ processes, the HARQ feedback messages being generated after determining whether each of the one or more transmitted first plurality of transport blocks was decoded correctly, and to transmit in a downlink of a wireless access interface, a second downlink control information message, providing an indication of communications parameters for a communications device to receive a second plurality of transport blocks in communications resources of the downlink according to a plurality of hybrid automatic repeat request-type, HARQ, processes, wherein the indication of the communications parameters provided by the second downlink control information message for each of the second plurality of transport blocks includes an indication of whether each of the second plurality of transport blocks is an initial transmission or a retransmission of the transport block according to the corresponding HARQ processes, and the indication of the communications parameters for the communications device to receive a subsequent second plurality of the transport blocks provided by the second downlink control information message is arranged to identify, to the communications device, a status of the subsequent second plurality of the transport blocks to be received when combined by the communications device with the determination of whether each of the one or more transmitted transport blocks of the first plurality of transport blocks was decoded correctly for which the received HARQ feedback message was generated.

Paragraph 18. Infrastructure equipment forming part of a wireless communications network, the infrastructure equipment comprising transmitter circuitry for transmitting on a downlink of a wireless access interface formed with the wireless communications network to one or more communications devices, receiver circuitry for receiving on an uplink of the wireless access interface from the one or more communications devices, and controller circuitry configured to control the receiver circuitry and the transmitter circuitry, and the controller circuitry is configured with the receiver circuitry and the transmitter circuitry to transmit, in a downlink of a wireless access interface formed by the wireless communications network, a first downlink control information message, providing an indication of communications parameters for a communications device to transmit a first plurality of transport blocks in communications resources of the uplink according to a plurality of hybrid automatic repeat request-type, HARQ, processes, and to receive, by the infrastructure equipment from the communications device one or more of the first plurality of transport blocks, to determine whether each of the first plurality of transport blocks was decoded correctly, and transmitting a HARQ feedback message providing one of an acknowledgement, ACK, or a negative acknowledgement NACK, on a downlink of the wireless access interface according to a corresponding HARQ process, and to transmit, in a downlink of a wireless access interface, a second downlink control information message, providing an indication of communications parameters for a communications device to transmit one or more of a second plurality of transport blocks in communications resources of the uplink according to a plurality of hybrid automatic repeat request-type, HARQ, processes, wherein the indication of the communications parameters provided by the second downlink control information message for each of the second plurality of transport blocks includes an indication of whether each of the second plurality of transport blocks is an initial transmission or a retransmission of the transport block according to the corresponding HARQ processes, and to determine for each of the second plurality of transport blocks that are indicated as initial transmission whether the communications device has transmitted a transport block.

Paragraph 19. Circuitry comprising receiver circuitry for receiving on a downlink of a wireless access interface formed by the wireless communications network, transmitter circuitry for transmitting on an uplink of the wireless access interface, and controller circuitry configured to control the receiver circuitry and the transmitter circuitry, and the controller circuitry is configured with the receiver circuitry and the transmitter circuitry to receive a first downlink control information message (M1), the first downlink control information message (M1) providing an indication of communications parameters for the communications device to receive a first plurality of transport blocks in communications resources of the downlink of the wireless access interface according to a plurality of hybrid automatic repeat request-type, HARQ, processes, to receive, after receiving the first downlink control information message (M1), one or more of the first plurality of transport blocks from the communications resources of the downlink, to determine whether data carried by the received one or more of the first plurality transport blocks has been decoded correctly, to transmit for each of the one or more received transport blocks a HARQ feedback message providing one of an acknowledgement, ACK, or a negative acknowledgement NACK, on an uplink of the wireless access interface according to a corresponding one of the HARQ processes, and to receive, by the communications device, a second downlink control information message (M2) providing an indication of communications parameters for the communications device to receive a second plurality of transport blocks in communications resources of the downlink according to the plurality of hybrid automatic repeat request-type, HARQ, processes, wherein the indication of the communications parameters provided by the second downlink control information message (M2) for receiving the second plurality of transport blocks includes an indication of whether each of the second plurality of transport blocks is an initial transmission or a retransmission of the transport block according to the corresponding HARQ processes, and to combine the determination of whether each of the one or more received transport blocks of the first plurality of transport blocks was decoded correctly with the indication of the communications parameters for the communications device to receive the second plurality of the transport blocks provided by the second downlink control information message, to identify a status of the second plurality of the transport blocks to be received.

Paragraph 20. Computer program code, which when executed by a processor performs a method according to any of paragraphs 1 to 14.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009.
[3] RP-170732, "New WID on Even further enhanced MTC for LTE," Ericsson, Qualcomm, RAN #7
[4] RP-170852, "New WID on Further NB-IoT enhancements," Huawei, HiSilicon, Neul, RAN #75
[5] RP-191356, "Additional MTC enhancements for LTE," Ericsson, RAN #84
[6] RP-191576, "Additional enhancements for NB-IoT," Huawei, RAN #84
[7] R1-1812121, "Scheduling of multiple DL/UL transport blocks in LTE-MTC," Ericsson, RAN1 #95

Annex 1

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 13 and 14.

FIG. 13 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 13, the resources of the wireless access interface are also temporally divided into frames where a frame 1200 lasts 10 ms and is subdivided into 10 sub-frames 1201 each with a duration of 1 ms. Each sub-frame 1201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 14, also includes an illustration of each sub-frame 1201, which comprises a control region 1205 for the transmission of control data, a data region 1206 for the transmission of user data and reference signals 1207 which are interspersed in the control and data regions in accordance with a predetermined pattern. The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [2].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 13, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDCSH so that only relevant data within the PDSCH is received and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 14 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. A frame 1300 is divided into 10 sub-frames 1301 of 1 ms duration where each sub-frame 1301 comprises two slots 1302 of 0.5 ms duration. Each slot 302 is then formed from seven OFDM symbols 1303 where a cyclic prefix 1304 is inserted between each symbol in a manner equivalent to that in downlink sub-frames.

As shown in FIG. 14, each LTE uplink sub-frame may include a plurality of different channels, for example a physical uplink communications channel (PUSCH) 1305, a physical uplink control channel (PUCCH) 1306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 1307 and sounding reference signals (SRS) 1308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [2].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 1309 and lower 1310 subcarriers/frequencies/resource blocks of an uplink sub-frame are reserved for control signalling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

What is claimed is:

1. A method of operating a communications device configured to receive data from a wireless communications network, the method comprising:
   receiving, by the communications device, in a downlink of a wireless access interface formed by the wireless communications network, a first downlink control information message, the first downlink control information message providing an indication of communications parameters for the communications device to receive a first plurality of transport blocks in communications resources of the downlink of the wireless access interface according to a plurality of hybrid automatic repeat request-type (HARQ) processes,
   receiving, after receiving the first downlink control information message, one or more of the first plurality of transport blocks from the communications resources of the downlink,
   determining whether data carried by the received one or more of the first plurality transport blocks has been decoded correctly,
   transmitting for each of the one or more received transport blocks a HARQ feedback message providing one of an acknowledgement (ACK) or a negative acknowledgement (NACK) on an uplink of the wireless access interface according to a corresponding one of the HARQ processes, and
   receiving, by the communications device, a second downlink control information message providing an indication of communications parameters for the communications device to receive a second plurality of transport blocks in communications resources of the downlink according to the plurality of HARQ processes, wherein the indication of the communications parameters provided by the second downlink control information message for receiving the second plurality of transport blocks includes an indication of whether each of the second plurality of transport blocks is an initial transmission or a retransmission of the transport block according to the corresponding HARQ processes, and
   combining the determination of whether each of the one or more received transport blocks of the first plurality of transport blocks was decoded correctly with the indication of the communications parameters for the communications device to receive the second plurality of the transport blocks provided by the second downlink control information message, to identify a status of the second plurality of the transport blocks to be received, and
   wherein the status of the second plurality of the transport blocks to be received indicates which transport blocks are an initial transmission, which transport blocks are a retransmission. and which transport blocks are not being transmitted.

2. The method according to claim 1, wherein each of the first and second downlink control channel messages provide the communications parameters for a same number of transport blocks for the first plurality of transport blocks and the second plurality of transport blocks.

3. The method according to claim 1, wherein the combining the determination of whether each of the one or more transport blocks of the first plurality of transport blocks was decoded correctly with the indication of the communications parameters provided by the second downlink control information message, includes
   identifying one or more of the second plurality of transport blocks to be received which will not be transmitted, a number of the one or more transport blocks to be received for the second plurality of transport blocks being lower than the number of each of the first and the second plurality of transport blocks for which the first and second downlink control message is received respectively.

4. The method according to claim 1, wherein the indication of the communications parameters provided by each of the first and second downlink control information messages includes for each of the transport blocks of the first and second plurality of transport blocks indicated by the first and second downlink control information messages a binary digit, which is used to indicate whether each of the transport blocks of the first and second plurality of transport blocks is either an initial transmission of a transport block according to a HARQ process or a retransmission of the transport block for the HARQ process, and the combining the determination of whether each of the one or more transport blocks of the first plurality of transport blocks was decoded correctly with the indication of the communications parameters provided by the second downlink control information message, includes
   identifying that one or more of the second plurality of transport blocks will not be transmitted by identifying that the binary digit for the one or more transport blocks with respect to the first downlink control information message for these one or more transport blocks has not changed and that the one or more transport blocks received with the first plurality of transport blocks were determined to have been decoded correctly.

5. The method according to claim 4, wherein the binary digit provided for each of the first and second plurality of transport blocks in the first and second downlink control information messages forms part of a New Data Indication (NDI) field.

6. The method according to claim 1, wherein the indication of the communications parameters provided by each of the first and second downlink control information messages includes for each of the first and second plurality of transport blocks an indication of a redundancy version providing a version of the data of the transport block, and the combining the estimate of whether each of the one or more transport blocks of the first plurality of transport blocks was decoded correctly with the indication of the communications parameters for the second downlink control information message, includes
identifying that one or more of the transport blocks of the second plurality of transport blocks will not be transmitted by identifying that the redundancy version is not the initial version and that those one or more transport blocks of the second plurality of transport blocks was decoded correctly.

7. The method according to claim 3, comprising:
after identifying, from the combination of the communications parameters of the second downlink control information message and the determination of whether the one or more received transport blocks of the first plurality of transport blocks were decoded correctly, that one or more of the transport blocks of the second plurality of transport blocks will not be transmitted, controlling a receiver of the communications device to reduce power for one period of the communications resources of the downlink channel in which the one or more transport blocks of the second plurality of transport blocks are not transmitted and to increase power to the receiver in another period of the communications resources in which others of the second plurality of transport blocks are transmitted to receive the others of the second plurality of transport blocks.

8. The method according to claim 7, wherein the one period in which the power to the receiver is reduced and the other period in which the power to the receiver is increased are continuous in time, the one or more transport blocks of the second plurality of transport blocks which are to be transmitted being grouped into continuous communications resources.

9. A method of operating an infrastructure equipment forming part of a wireless communications network configured to transmit data to a communications device, the method comprising:
transmitting, by the infrastructure equipment, in a downlink of a wireless access interface formed by the wireless communications network, a first downlink control information message, providing an indication of communications parameters for a communications device to receive a first plurality of transport blocks in communications resources of the downlink according to a plurality of hybrid automatic repeat request-type (HARQ) processes, and
receiving, by the infrastructure equipment from the communications device for each of the one or more transmitted first plurality of transport blocks a HARQ feedback message providing one of an acknowledgement (ACK) or a negative acknowledgement (NACK) on an uplink of the wireless access interface according to a corresponding one of the HARQ processes, the HARQ feedback messages being generated after determining whether each of the one or more transmitted first plurality of transport blocks was decoded correctly, and
transmitting, by the infrastructure equipment, in a downlink of a wireless access interface, a second downlink control information message, providing an indication of communications parameters for a communications device to receive a second plurality of transport blocks in communications resources of the downlink according to a plurality of HARQ processes, wherein the indication of the communications parameters provided by the second downlink control information message for each of the second plurality of transport blocks includes an indication of which of the second plurality of transport blocks are an initial transmission, which of the second plurality of transport blocks are a retransmission, and which of the second plurality of transport blocks will not be transmitted according to the corresponding HARQ processes, and the indication of the communications parameters for the communications device to receive a subsequent second plurality of the transport blocks provided by the second downlink control information message is arranged to identify, to the communications device, a status of the subsequent second plurality of the transport blocks to be received when combined by the communications device with the determination of whether each of the one or more transmitted transport blocks of the first plurality of transport blocks was decoded correctly for which the received HARQ feedback message was generated.

10. A method of operating a communications device to transmit data to a wireless communications network, the method comprising:
receiving, by the communications device, in a downlink of a wireless access interface formed by the wireless communications network, a first downlink control information message, the first downlink control information message providing an indication of communications parameters for the communications device to transmit a first plurality of transport blocks in communications resources of an uplink of a wireless access interface according to a plurality of hybrid automatic repeat request-type (HARQ) processes,
transmitting, after receiving the first downlink control information message, the first plurality of transport blocks in the communications resources of the uplink,
receiving on a downlink of the wireless access interface, by the communications device, for each of the one or more transmitted first plurality of transport blocks a HARQ feedback message providing one of an acknowledgement (ACK) or a negative acknowledgement (NACK) according to a corresponding one of the HARQ processes, the HARQ feedback indicating whether each of the transmitted first plurality of transport blocks was decoded correctly,
receiving, by the communications device, a second downlink control information message providing an indication of communications parameters for the communications device to transmit a second plurality of transport blocks in communications resource of the uplink according to the plurality of HARQ processes,
determining from each of the received HARQ feedback messages which of the second plurality of transport blocks is to be a retransmission of a transport block from the first plurality of transport blocks, which of the second plurality of transport blocks are used for an initial transmission of a new transport block, and which of the second plurality of transport blocks will not be transmitted, and
based on an amount of uplink data for transmission by the communications device, not transmitting a transport block in one or more of the second plurality of transport blocks which are determined for use for an initial transmission or transmitting data in only a part of the communications resources provided for a transport block determined for use for an initial transmission in one or more of the second plurality of transport blocks.

11. A method of operating a communications device of claim 10, comprising:
transmitting the retransmission of the one or more transport blocks of the first plurality of transport blocks, and
transmitting data in one or more transport blocks of the second plurality of transport blocks, which are not being used for retransmission, as one of an initial transmission of a transport block or transmitting data as a part transmission of a transport block, wherein the transmitting the retransmission of the one or more transport blocks from the first plurality of transport blocks and the initial transmission of the one or more transport blocks or part transport blocks is adapted to be continuous in time, the one or more of the second plurality of transport blocks which are not used or used in part of communications resources provided for a transport block being formed as a continuous section of communications resources in which there is no transmission.

12. The method according to claim 1, wherein the communication device is a machine-type communication (MTC) device.

13. The method according to claim 5, wherein the status of each of the second plurality of transport blocks is determined, at least in part, on whether an ACK or a NACK is transmitted for each of the first plurality of transport blocks in combination of whether the NDI field for each of the second plurality of transport blocks is toggled with respect to the NDI field of each of the first plurality of transport blocks.

14. The method according to claim 13, wherein a status of a transport block of the second plurality of transport blocks indicates a new transmission when an ACK is transmitted and a corresponding NDI field is toggled.

15. The method according to claim 13, wherein a status of a transport block of the second plurality of transport blocks indicates no transmission when an ACK is transmitted and a corresponding NDI field is not toggled.

16. The method according to claim 13, wherein a status of a transport block of the second plurality of transport blocks indicates retransmission when a NACK is transmitted and a corresponding NDI field is not toggled.

* * * * *